(12) United States Patent
Owen et al.

(10) Patent No.: US 6,611,501 B1
(45) Date of Patent: Aug. 26, 2003

(54) PROCESS MANAGEMENT SYSTEM

(75) Inventors: Martin John Owen, Colchester (GB); Satya Patel, London (GB); Ben Strulo, Witham (GB); Stephen Leslie Corley, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/043,417

(22) PCT Filed: Aug. 12, 1997

(86) PCT No.: PCT/GB97/02157
§ 371 (c)(1),
(2), (4) Date: Mar. 19, 1999

(87) PCT Pub. No.: WO98/07282
PCT Pub. Date: Feb. 19, 1998

(30) Foreign Application Priority Data

Aug. 12, 1996 (EP) .............................. 96305887

(51) Int. Cl.⁷ ........................... H04L 12/24; H04Q 3/00
(52) U.S. Cl. ................. 370/254; 370/270; 370/444; 706/10
(58) Field of Search ........................... 370/254, 270, 370/444; 706/10, 46, 50; 709/228

(56) References Cited

FOREIGN PATENT DOCUMENTS

| WO | WO-94/27411 | * | 11/1994 |
| WO | WO-95/15635 | * | 6/1995 |

OTHER PUBLICATIONS

Jordan et al, "Connectn Establishment in High–Speed Networks", IEEE Journal on Selected Areas in Communication, vol. 13, No. 7, Sep. 1995, pp. 1150–1161.*

* cited by examiner

Primary Examiner—Edwin C. Holloway, III
(74) Attorney, Agent, or Firm—Nixon & Vanderhye PC

(57) ABSTRACT

In a connection management system for setting up connections in a communications network, run-time negotiation is carried out to avoid feature interaction. Users of the network are provided with user agents (intelligent software) which have access to user profiles. When a calling user wants to set up a particular connection configuration, which may involve service features such as ring back later on busy, their user agent sends a connection configuration proposal to the user agent for a called user. The two user agents then negotiate to establish a mutually acceptable connection configuration, if one is available. The negotiation is based on alternative connection configurations stored in order of preference in the respective user profiles. These are proposed and counterproposed by the user agents in descending preference order until the mutually acceptable configuration is reached or the connection fails.

25 Claims, 11 Drawing Sheets

System Model

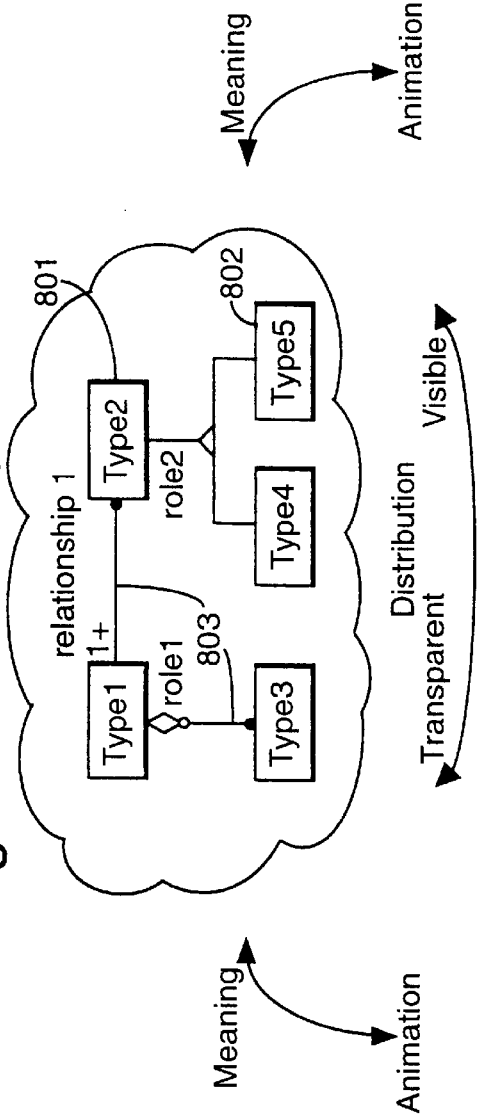
Fig.1a. Information viewpoint
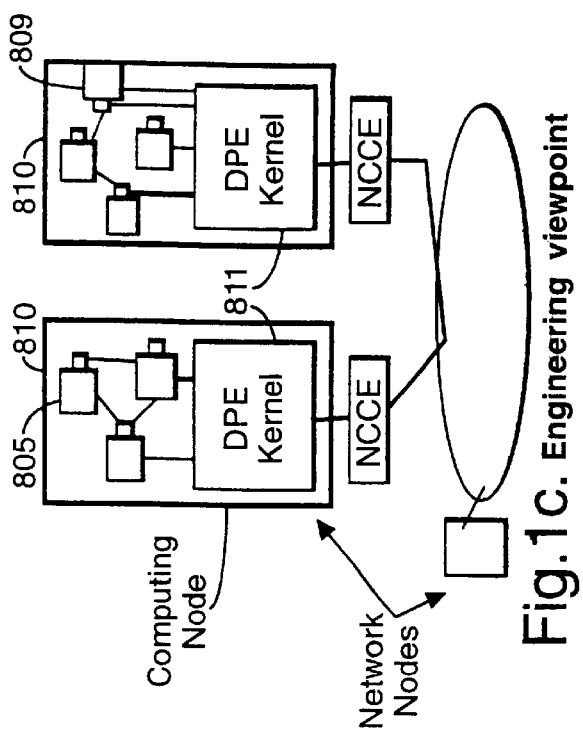
Fig.1c. Engineering viewpoint
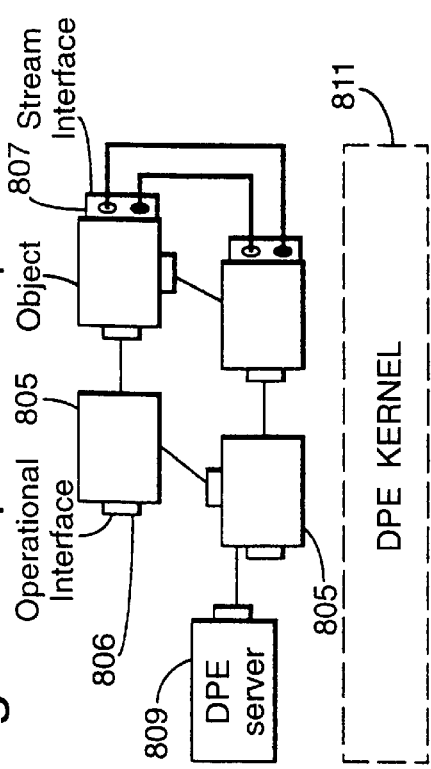
Fig.1b. Computational viewpoint Structure of the DPE User Agent Architecture Incoming Call Configurations

System Model

Object Diagram

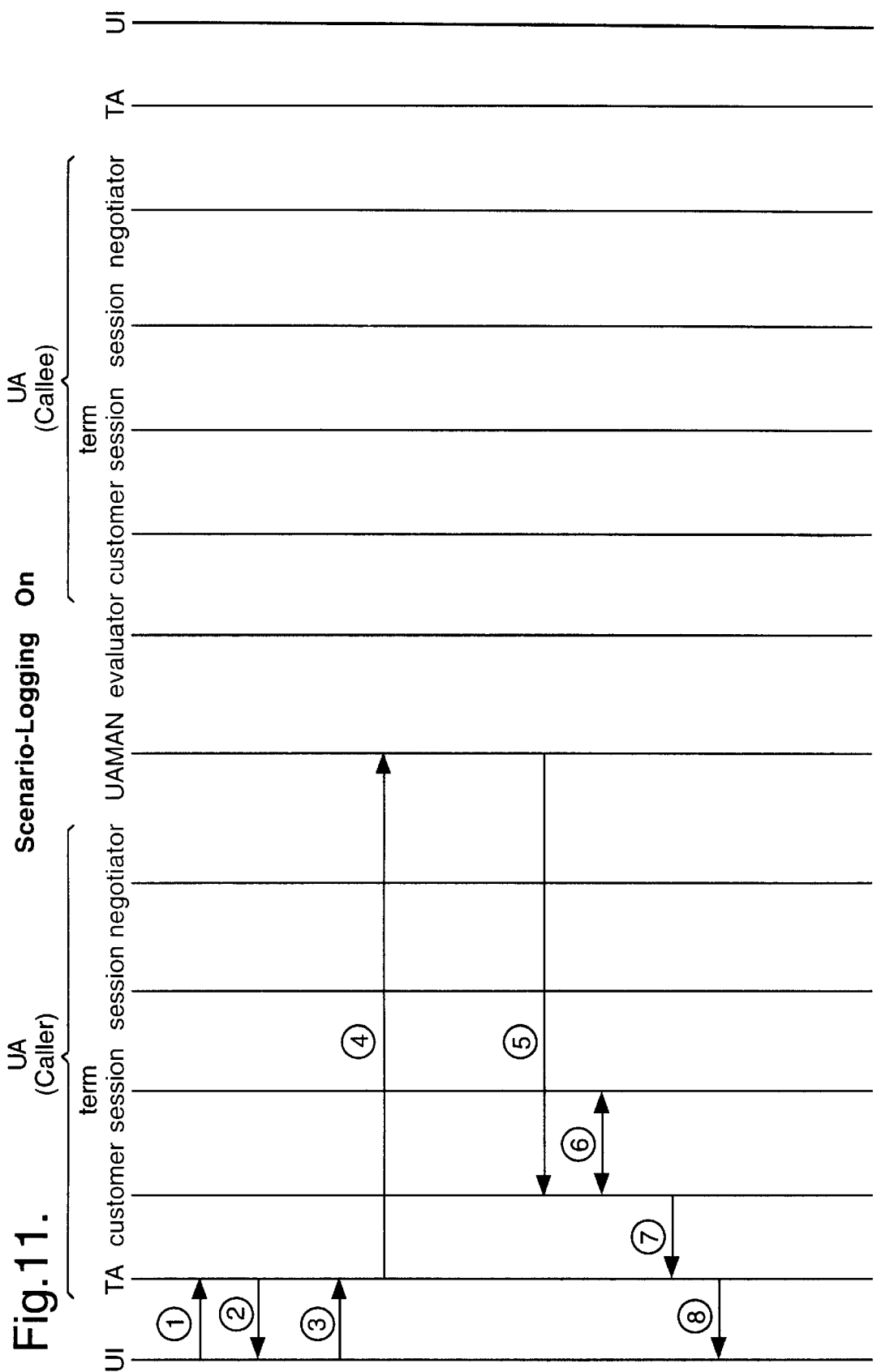

PROCESS MANAGEMENT SYSTEM

BACKGROUND OF THE INVENTION

The present invention relates to process management systems. It finds particular application in the provision of services over a communications network, with particular reference to feature interaction.

There are many processes which are complex and which can be carried out in more than one way. Embodiments of the present invention are intended to select and configure the steps in a process.

An example of a complex process, which can be controlled by a management system according to an embodiment of the present invention, is that of service provision over one or more communications networks. Recently, the services available to users over communications networks have grown much more sophisticated. For instance, in the UK, it is now possible to subscribe to call waiting and answering services, provided over the public switched telecommunications network (PSTN). It is expected that modernisation of existing networks, and the provision of new networks, will lead to a proliferation of new services.

Increasingly in the future, different types of services are likely to be offered over communications networks. For instance the increasing capability of technology is enabling a future where a wide variety of multimedia services can be delivered to users over communications networks. These services could include simple voice telephony, multimedia conference amongst many users, home shopping and video on demand. Additionally users may want such services to be delivered over a variety of terminal types such as a portable phone, portable personal computer and domestic television set with a set-top-box.

These services come not only from development of the telecommunications environment, including telephony and cable television, but also from environments previously separate, such as the computing environment. For instance, there has been major growth of computer network services, such as those available on the Internet. Collectively all these services are referred to herein as information services.

Although to date (at least in the telephony world) the communication network operator and the service provider (SP) have generally coincided, this is not essential. Another trend expected in the future is that, increasingly, the service provider will be separate from the network operator. As in the case of Internet, several SPs (vendors) may offer their services (products) over a common network. Indeed, there may be further complexity involved in that the "common network" might in fact comprise multiple networks connected together, managed by many different network providers.

Communications services are based on functionality provided by the network(s) carrying the services. In the telecommunications arena, recent developments mean that this could be provided increasingly by intelligence, ie decision-making software, in an intelligent network architecture. With the convergence of computing and telecommunications technology, however, functionality may in practice be provided in other ways.

Regardless of how functionality will be provided, there has emerged a problem of "feature interaction". This arises for instance when features which would normally be triggered in provision of one service, conflict with features normally triggered in provision of another service and the two services are called on at the same time. A simple example of feature interaction is the conflict between "Call Forwarding" and "Call Waiting". Clearly a call cannot be both forwarded and kept waiting.

As services grow more diverse, feature interaction has been found to be a very complex problem. It is considered one of the fundamental obstacles to rapid development and deployment of new services. As the number of new features grows, the time required to introduce them grows.

In attempting to solve the feature interaction problem, a strategy has been to classify the solutions into avoidance, detection and resolution. Avoidance looks at ways to prevent undesired feature interactions. Detection assumes that feature interactions will be present, and determines methods for identifying and locating them. Resolution assumes that feature interactions will be present and detected, and looks at mechanisms for minimising their potential adverse effects. It is not practical to assume that the solution can be provided by just one approach. Feature interactions found before deployment can be avoided. In contrast, feature interactions detected during run-time must be resolved at run-time. One advantage of run-time interaction resolution is that the problem space is reduced, since only information specific to each occurrence of an interaction need be considered.

Current approaches to run-time resolution include event based resolution and negotiating software agents. Event based resolution is based on an approach of collecting events during the basic call process which trigger the activation of features. In this way, the feature manager can control which features should be invoked. These approaches can resolve issues such as signal ambiguities and incompatible combinations of call-processing activities. An alternative approach is to use negotiating software agents proposed by Griffeths and Velthuijsen in "The Negotiating Agents Approach to Runtime Feature Interaction Resolution", published in 1994 by IOS Press. This approach uses agents to represent users, network providers, and terminals, collectively called entities. Users define policies which describe how each feature should behave. These policies constrain the set of operations that each user or provider is willing to perform in initiating or modifying a call. A negotiation mechanism is used to resolve conflicts between the policies of different users, thus maintaining autonomy amongst the users.

International patent application WO-A-94/27411 describes a method of resolving conflicts among entities in a distributed system wherein a negotiating software agent represents each entity, the method being based upon generation of proposals and counter-proposals on the nature of a communication session to be established between those entities, selected by the agents from a goal hierarchy. A single goal hierarchy is used by all the agents involved in establishing the session although different agents may mark a particular node within the hierarchy acceptable or unacceptable. On receiving an unacceptable proposal an agent may derive, from the goal hierarchy, the overriding goal of the user initiating the proposal and hence select a counter-proposal from within the same hierarchy.

In this description the term "agent" relates to a function or process which operates in a computing environment and which can act autonomously to receive a request for an operation and provide a result. An agent normally has an up-datable data store for holding data relevant to local conditions, and usually also for holding some global information about the disturbed environment in which it sits. Agents operate autonomously, having decision-making functionality (intelligence) allowing them to negotiate and output a result in response to an incoming message. The result may be for instance a control signal to an apparatus. In the communications environment, the control signal may cause a connection to be made according to a particular configuration.

Typically, an agent is embodied as a piece of software, for example written in the C programming language, running on a suitable computing platform, for example a UNIX (Trademark) based platform. Requests and results are passed between an agent and a requesting entity, which might be another agent, across a suitable communications network, for example a TCP/IP-based local area network, to which the computing platform is interfaced. In some embodiments, plural agents can reside on a common computing platform and, conversely, a single agent can be realised across plural computing platforms in the environment. Also, the computing environment might be heterogeneous, and support various different types of computing platforms.

SUMMARY OF THE INVENTION

According to a first aspect of the present invention, there is provided a method of processing data in data processing means, so as to generate an output signal in response to at least one input signal, wherein the input signal comprises at least one data element, which method comprises:

i) storing a set of data elements;
ii) allocating to each stored data element a weighting factor;
iii) receiving said input signal;
iv) for each data element of the input signal, searching for that data element in the stored set of data elements;
v) for each data element of the input signal which is found by the search in the stored set of data elements, reviewing the weighting factor allocated to that data element; and
vi) generating an output signal determined by the reviewed weighting factors.

Preferably, there are provided at least first and second data processing means, wherein the input signal is received by the first data processing means from the second data processing means and the output signal is sent by the first data processing means to the second data processing means, said output signal comprising a response selected from:

a) acceptance;
b) rejection; and
c) a signal comprising at least one data element.

In embodiments of the present invention, the data processing means for a first entity and a second entity can make proposals and counter proposals to each other over the way in which a process is to be carried out. Each data processing means looks at its own preferences, the "weighting factors", for the elements of the proposal incoming from the other data processing means. If it can put forward a counter proposal which is more acceptable to it in the light of its own preferences, it will do so and wait for the other data processing means to review the counter proposal in its turn, against its own preferences.

Clearly, there will be circumstances where a data processing means accepts a proposal even though it can put forward a better proposal from its point of view. For instance, this will happen if it has already had the "better" proposal rejected, or if the negotiation process has become too protracted.

Processes other than communications service configuration which might benefit from an embodiment of the present invention would include for instance establishing parameters such as costs and timing for electronic trading and transfer of funds, establishing access and download of data, and information filtering.

Embodiments of the present invention are particularly useful when directed to identifying and resolving feature interactions in communications service provision at runtime.

According to a second aspect of the present invention, there is provided a method of establishing a connection over a communications network, for service provision between first and second users of the network, there being provided respective connection setup means for said users, which method comprises:

i) storing for each of said users data defining at least one connection configuration;
ii) storing in respect of data defining a connection configuration for the second user, data defining at least one alternative connection configuration; and
iii) storing in respect of said data defining a connection configuration for the second user, and in respect of the data defining the or each of its alternative connection configuration(s), a respective priority indicator;

the method further comprising a negotiation process for the establishment of a connection by means of:

iv) transmitting data defining a proposed connection configuration from the connection setup means for the first user to the connection set up means for the second user;
v) reviewing the data defining the proposed configuration at the connection setup means for the second user by accessing the data defining configurations and the respective priority indicators stored in respect of the second user; and
vi) selecting and transmitting a response to the connection setup means for the first user, the response being determined at least in part by the result of the review step v) above, and selected from acceptance or rejection of the proposed connection configuration, or comprising data defining a counter-proposed connection configuration.

According to a third aspect of the present invention, there is provided apparatus for use in establishing communications connections by means of a communications network, the apparatus comprising:

i) first and second network access points;
ii) at least one data store for storing user profiles, each user profile comprising a set of connection configurations associated with a respective user, and for storing priority indicators in relation to at least two of said connection configurations; and
iii) first and second connection set up means for use in establishing connections between said access points, wherein said first and second connection set up means are each provided with a negotiation protocol, access to at least one user profile in the data store, and means to review said priority indicators for that user profile, such that a communication connection can be set up between the access points, on behalf of at least two users, by negotiation between the first and second connection set up means, based on the respective user profiles and the related priority indicators.

It will be seen that embodiments of the present invention allow feature interactions to be circumvented at run-time for a communications service by means of a user being able to preselect to abandon a service aspect in response to a potential compromise proposal from another user by building in an order of preference for service aspects.

Significant aspects of preferred embodiments of the present invention for use in communications service provision are:

the introduction of scheduling so that an otherwise failed connection can be reattempted the provision of a preference order for connection configurations a negotiation strategy which can be varied both in general terms and specifically for each user the facility to send multiple connection configurations between users, and the negotiation protocol offered the representation of features as high level goals, how these high level goals are mapped into a user configuration, and the way in which agents, acting on behalf of the users involved in any given connection, negotiate in the connection setup process.

Although embodiments of the invention are clearly very useful in communications service provision, as described above, they can also have application in a wide range of process environments. Wherever there is a choice in the way elements of a process might be carried out, and wherever there are different entities involved in the carrying out of the process, which entities may have different preferences, then an embodiment of the present invention may be appropriate.

TERMINOLOGY

For the purposes of this patent specification, we will define the following terms:

Feature

A feature is a tariffable unit, e.g. Call Waiting. There can be two types of feature. A technology feature is an individual operation that the platform performs. A policy feature on the other hand, is a constraint on the set of operations that a user or provider is willing to perform in initiating or modifying a call. Embodiments of the present invention relate to this second type of feature.

Service

A service is a collection of features. A feature modifies one or more aspects of a service, while using the remaining functionality provided. An example of a service is that currently offered by the present applicant in the UK: "Network Services". This comprises the features "Call Waiting", "Call Diversion", "3 Way Calling" and others.

Feature Interaction

A feature interaction occurs when the behaviour of one feature affects the behaviour of another feature.

It should be noted that although the word "call" is used throughout this specification, embodiments of the present invention should not be taken to be limited to voice or speech transmission. The principles of the invention will clearly also be relevant to other transmissions, for instance potentially involving data or information transmission.

It is recognised that computing infrastructures in telecommunications can become extremely complex and this could potentially limit manageability, extendibility, scalability and robustness. The approach exploited in embodiments of the present invention, which provides simplicity in the infrastructure, is that of intelligent agent technology, the basis of which is described in "Distributed Artificial Intelligence", ed. Huhns M. N., Pitman, London 1987. An intelligent agent in this context can be broadly described as a software based entity which acts on behalf of another entity. It might comprise updatable data, which might only be locally relevant, and usually some sort of negotiating or decision-making functionality. A community of agents can then perform negotiation tasks amongst themselves to decide a way forward on behalf of multiple entities in a distributed system.

Software clearly provides the basis of the infrastructures needed in service provision systems according to embodiments of the present invention to implement scalable and deployable solutions. Different types of software technology might be employed, and there are several functional design approaches which could be used. However, a common approach to the design and implementation of software systems in this technical environment uses object oriented software technology. This is known and used by international standards bodies (e.g. Open Software Foundation Object Management Group (OSF OMG), Open Systems Interconnection (OSI)). Reference might be made for example to "Object Management Architecture Guide", Revision 2.0, Second Edition, Sep. 1, 1992. OMG reference: OMG TC Document 92.11.1.

In general terms, "objects" in this context comprise units of software which represent entities or concepts of the real world by means of a combination of data and functionality. Data is encapsulated as internal attributes of an object and the associated functionality is encapsulated as methods which use or operate upon the attributes. Although an object may receive a message from another object requesting it to perform a method on its attributes which may result in the return of data, the attributes themselves are not directly accessible by external objects. Such high degrees of encapsulation have not been readily available in earlier software technologies.

Embodiments of the present invention are advantageously based on object-oriented technology.

From the perspective of the enterprises involved in satisfying the overall requirements of users in the future, there are likely to be significant challenges involved in designing a suitable infrastructure. A potential starting point would clearly be provision of an architecture (from high-level design to low-level implementation) that can technically and economically support services of the future. Software and hardware resources of the computing infra-structure would be enabling components of the service architecture. An aspect of the computing infrastructure is the processing environment and a known environment of suitable type for use in embodiments of the present invention is the distributed processing environment (DPE) which allows multiple processes to be run using multiple computer "nodes". The DPE maintains a view of the multiple nodes and processes and handles message passing between nodes and objects, providing a common language for the exporting of interfaces for different objects residing on different nodes. That is, it assists with aspects of the software and hardware location transparency and facilitates the provision of scalable and deployable solutions. Standards for DPE already exist and are being extended.

A node in this context might conveniently be provided by a computer with processors and memory which is capable of running an operating system, compatible distributed processing platform and objects executed as processes on the computer.

Another advantageous characteristic would be that the communication network (or networks) itself is capable of transmitting a wide range of services. There are network technologies which are capable of supporting multiple service delivery and some examples of these are based on the asynchronous transfer mode (ATM) and synchronous digital hierarchy (SDH) technologies. A common feature of such networks is that they can use a range of transmission rates flexibly, choosing that most appropriate for the service being delivered.

Future service retailing might be offered across an architecture of the telecommunication information networking architecture type. This brings together elements of the multi-service network and DPE technologies mentioned. An example of such an architecture is that being defined by the TINA Consortium. Reference might be made to "Telecommunications Information Networking Architecture", Oshisanwo A., Boyd T., Proc. 4th IEEE Conf. Telecommunications, IEEE, London 1993.

BRIEF DESCRIPTION OF THE DRAWINGS

Embodiments of the present invention will now be described, by way of example only, with reference to the accompanying Figures in which:

FIG. 1 shows information, computational and engineering representations of a system architecture for use in designing embodiments of the present invention;

FIGS. 11 and 12 show process steps involved in logging on and attempting to make a call using an embodiment of the present invention.

DETAILED DESCRIPTION OF THE INVENTION

Figure 2:
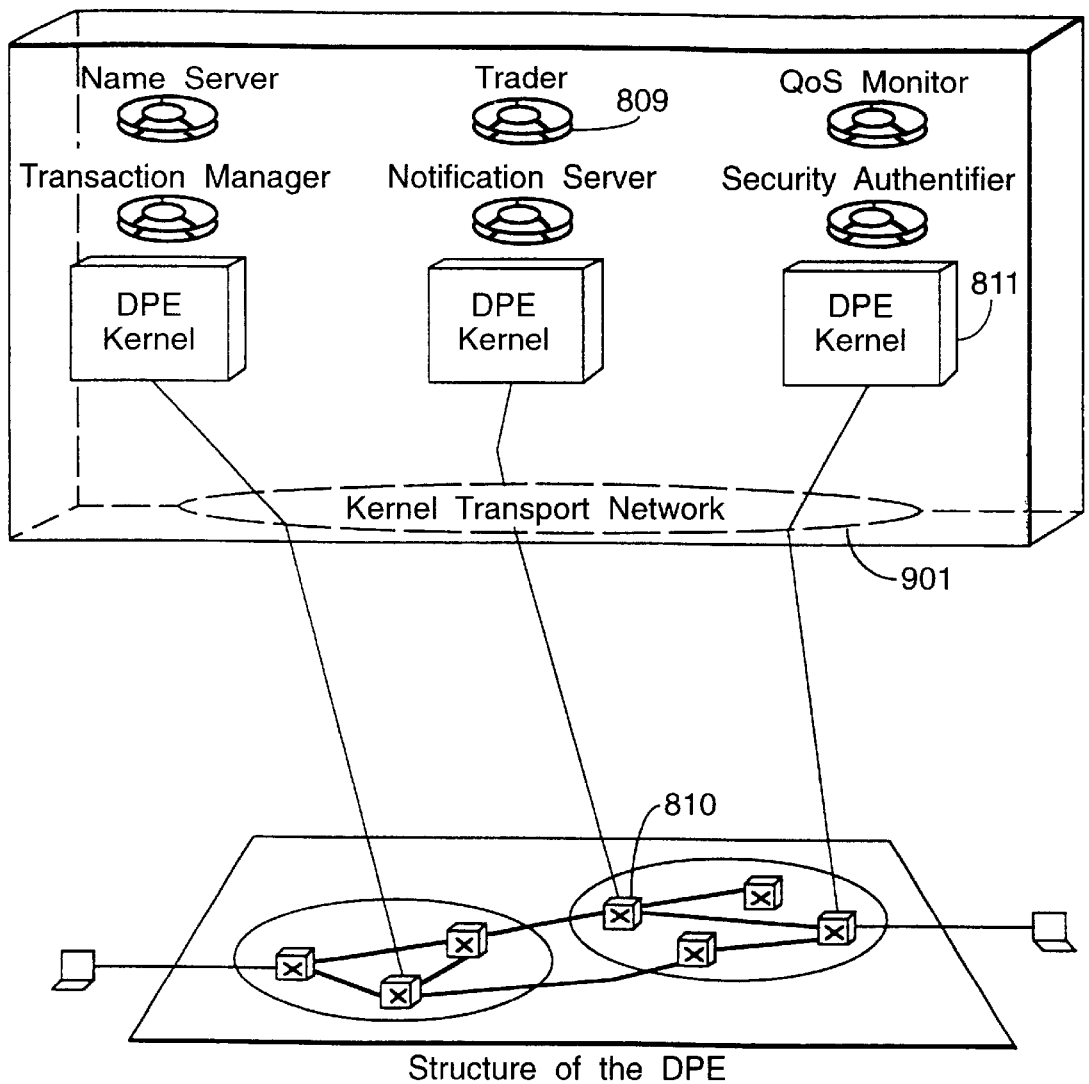
FIG. 2 shows the structure of a DPE relevant to FIG. 1.

As mentioned above, a suitable technical context for embodiments of the present invention would be an information networking architecture of the type defined by the Telecommunications Information Networking Architecture Consortium (TINA-C). Such an architecture is based on Open Distributed Processing (ODP) principles of object orientation and distribution, applied to telecommunications system design using Telecommunications Management Network (TMN) managed objects and Intelligent Network (IN) concepts for service management and control.

In a TINA-C architecture, there are three sets of concepts, a logical framework architecture, a service architecture, and a management architecture.

The logical framework architecture defines concepts and principles for the design of object-oriented software that operates in a distributed environment. Here a traditional layered computer architecture is defined, with computers and computer networks at the bottom, a distributed processing environment (DPE) in the middle, and (object-oriented) application software on top.

The application software is itself subject to organisation in TINA-C. The service architecture defines basic object types, and rules for their usage that can be used to design application software that provides services. A service is defined as a meaningful set of capabilities provided to a user.

A service may have many users in different roles. For example, the end-user is the person who uses the service for its intended function, the service manager manages the service, and the network provider provides and manages the underlying resources required by a service. The notion of service in TINA-C applies to all applications that are accessible to users, including management services. The service architecture contains a call model suitable for a wide range of service types.

The management architecture defines object types, and rules for their usage, that can be used to design application software to manage services, networks and computing systems.

The (known) OMG type DPE core provides for communications between objects, provides dynamic bindings via a trader function and provides notification servers to give management information (such as faults, performance and the like). It provides generic "Application Programming Interfaces" (APIs) and message passing facilities. All application software is assumed to run on a DPE.

Available documentation, in addition to the reference given above, includes a set of deliverables, such as "O-O Modelling and Design", by J Rumbaugh et al, published by Prentice Hall in 1991, "Overall Architecture" TINA-C Deliverable 1994 by M Chapman et al and "Guidelines for the Definition of Managed Objects", published in "The Management of Telecommunications Networks" edited by R Smith et al and published by Ellis-Horwood in 1992.

System Design Techniques

Referring to FIG. 1, to enable system design according to a TINA-C architecture, three ODP viewpoints can be selected, these being as follows:

Information: a viewpoint on a system that focuses on the semantics of information and information processing activities in the system.

Computational: a viewpoint on a system that focuses on the distributable software objects and their interactions.

Engineering: a viewpoint on a system that focuses on the deployment and distribution aspects of the system and on the infrastructure to support distribution.

For each of these, a set of modelling concepts are defined, providing a vocabulary that can be used to specify a system in the viewpoint addressed.

The information modelling concepts shown in FIG. 1*a* provide the framework for information specifications, describing the types 801, 802 of information used in a system and the activities that are performed on the information. An information specification describes the semantics of the problem domain that the application software is being designed for. For example, in a banking scenario an information model may contain objects such as account, debit, credit, and balance, and relationships such as debits plus credits equals balance.

The fundamental concepts of information modelling are objects, which are information bearing entities, object types 801, 802, that classify objects and define an object's characteristics in terms of attributes and operations that may be performed on objects, and relationships 803 that define links between, and aggregations of, objects.

Within TINA-C the notation chosen for information specifications is the ISO/IEC and ITU-T recommended GDMO (Guidelines for the Definition of Managed Objects) with GRM (General Relationship Model). GDMO is extensively used in the TMN community for information modelling and thus allows TINA-C to directly reuse this work.

Rumbaugh's OMT (Object Management Tool) notation (described in "Object-Oriented Modelling and Design", by Rumbaugh et al, published by Prentice-Hall in 1991) is used for graphical representation of information specifications.

The computational modelling concepts shown in FIG. 1b provide the framework for computational specifications. A computational specification describes distributed telecommunications applications in terms of computational objects 805 interacting with each other. Computational objects are defined without any knowledge of where the computational objects will eventually be deployed i.e. distribution is made transparent. This allows for the specification of a software system that can tolerate the redeployment of software onto different nodes of a network without affecting the specification. The fundamental concepts of computational modelling are objects 805 and interfaces 806, 807. Objects are the units of programming, and encapsulation. Objects interact with each other by the sending and receiving of information to and from interfaces. An object may provide many interfaces, either of the same or different types. There are two forms of interface that an object may offer or use: operational interface 806 and stream interface 807. An operational interface 806 is one that has defined operations, that allow for functions of an offering (server) object 809 to be invoked by other (client) objects. An operation may have arguments and may return results. A stream interface 807 is one without operations (i.e. there is no notion of input/output parameters, requests, results, or notifications). The establishment of a stream between stream interfaces 807 allows for the passing of other structured information, such as video or voice bit streams.

A notation which might be chosen for computational specifications is TINA-C ODL (Object Definition Language), which is an enhancement of OMG IDL (Object Management Group Interface Definition Language). TINA-C has extended OMG IDL to allow for the definition of objects that have multiple interfaces and for the definition of stream interfaces.

The engineering modelling concepts shown in FIG. 1c provide the framework for engineering specifications. An engineering specification describes the deployment view of a system in terms of which computational objects 805, 809 are placed on what computing node 810. It also defines the infrastructure to allow objects to execute and communicate with each other.

DPE and Hardware Context

Referring to FIG. 2, the infrastructure aspects of the engineering model will define the Distributed Processing Environment (DPE). As mentioned above the DPE is an infrastructure (of known type) that supports the interactions of computational objects. The DPE shields applications programs from the heterogeneous and distributed nature of the underlying environment, and provides the mechanism that allows objects to interact without knowing the computing nodes 810 they are on. The DPE defines four types of entity: DPE kernel 811, kernel transport network 901, DPE stubs, and DPE servers 809.

The DPE kernel defines a core set of communications, storage and processing capabilities (e.g., protocol stack). This core set is assumed to be present on each node.

The kernel transport network 901 is a communications network to which all DPE kernels are attached in order to exchange messages to facilitate object interaction. It is defined in order to logically separate the computing network from a transport network which is used for the transmission of voice and video. The logical separation recognises that the two networks may have different requirements on quality of service. However, they may both be implemented by the same physical network.

DPE stubs are software modules linked with computational objects which intercept interactions on objects, and use the underlying kernel transport network 901 to establish bindings and to transmit and receive invocation messages to and from remote objects. In practice, an interface for an object is designed and compiled. This generates a stub which will receive incoming messages to the object and select which operation is to be invoked by means of the interface.

DPE servers 809 provide infrastructure support. Two examples might be a trader and a notification server. A trader provides a run-time mechanism that allows objects to locate the interfaces of other objects. A notification server enables objects to emit notifications (i.e. significant events that occur during the lifetime of an object) to other objects. Objects wishing to receive notifications register at run-time with the notification server.

Figure 3:
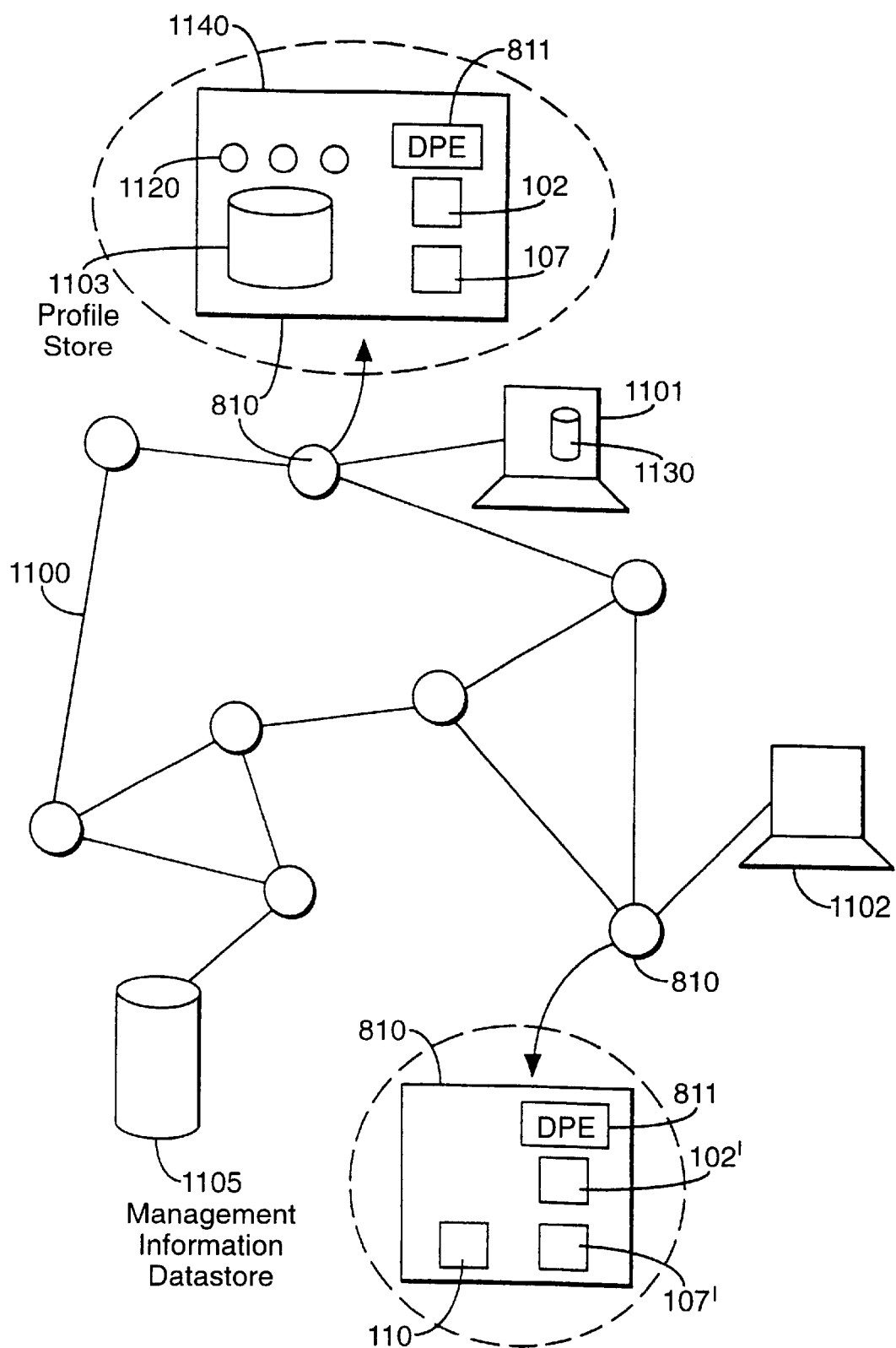
FIG. 3 shows a principally hardware view of platform for use in embodiments of the present invention.

Referring to FIG. 3, the hardware view of a system in which embodiments of the present invention might be built is based on a transport network 1100 which will carry for instance voice and data services, provided by service providers to users. The users will be connected to the network by different pieces of customer premises equipment (CPE) 1101, 1102. The various parties involved in offering and carrying those services, such as the service retailer, service provider and network provider, are also connected at computational nodes 810 to the transport network 1100. Intelligent software agents, for instance a terminal agent 102 and a user agent 107, will sit on either the same or different ones of computational nodes 810 connected to the transport network 1100.

As shown in FIG. 3, the terminal agent 102 and user agent 107 sit on the same computational node 810. These agents are provided with data of various types, including for instance user profiles in a user profile store 1103 which happens to share the computational node 810 with the user agent 107 and terminal agent 102. Other data stores available by means of the transport network 1100, as shown, might for instance include a management information data store 1105. The management information data store 1105 may provide global management information in respect of services. Each computational node 810 is provided with a DPE kernel 811, and therefore a protocol stack for use according to DPE principles.

"Session" and "Access" Concepts

TINA-C systems make use of "session" concepts and "access" concepts. These are as follows.

Session concepts define those objects and interfaces that are required to support the initiation of, interaction with, and termination of services. Although services by their nature are different from each other, they all have a common fundamental property in that they provide a context for relating activities. Such a context is termed a Session. As a generic definition, the term session represents a temporal period during which activities are carried out with the purpose of achieving a goal. Three types of session have been identified: service session, user session, and communications session.

A Service session is the single activation of a service. It relates the users of the service together so that they can interact with each other and share entities, such as documents or blackboards. A service session logically contains the service logic. A service session is computationally represented by a service session manager. A service session manager offers two types of operational interfaces. The first is a generic session control interface. This provides operations that allow users to join and leave a service. For certain services it may also offer operations to suspend and resume involvement in a service. The second type of interface will provide service specific operations, and will be dictated by the capabilities offered by the service logic.

The ability to suspend and resume involvement in a service is a desirable feature for some services. For example, consider a multi-media conference that occurs over several days. During the night, when the conference is not in use, it should be possible to release expensive communications resources. The service session can maintain state about the conference, such as the users and resources involved. Maintenance of state and the ability to suspend and resume involvement would avoid the need for tearing down and recreating the service each day.

A User session maintains state about a user's activities and the resources allocated for their involvement in a service session. Examples of state held in a user session include the user's accumulated charge, suspension and resumption history, and service specific state such as the current page being edited in a distributed document editing service, for example. When a user joins a service session, a user session is created. It is deleted when he leaves. The service session maintains links to the user sessions and thus provides a group oriented view.

A Communication session is a service oriented abstraction of connections in the transport network. A communication session maintains state about the connections of a particular service session, such as the communication paths, endpoints and quality of service characteristic. A communication session is required only when stream between computational objects are required. Computationally a communication session manager provides the features of a communication session. It provides a connection graph interface of a service session to manipulate. A connection graph is an abstraction that defines concepts such as endpoints and lines. A service session expresses connectivity requirements be adding, removing and linking end-points and lines. A service session manager will request connectivity between stream interfaces of computational objects. The communication session manager calls upon connection management objects to establish physical connections between the network access points of the relevant computing node, and nodal services that allow for a network access point to be connected to the software stream interface. Connection management components are not discussed further in this specification.

A user can be simultaneously involved in multiple service sessions. A service session has one or more users associated with it, and for each associated user there will be a related user session. A service session may have one or more communication sessions if the service involves stream communication. A communication session is related to exactly one service session.

The purpose of these separations is to decouple service oriented activities from connection oriented activities. Many types of services may exist in a future network and not all will require the explicit establishment of connections (streams). The service session is therefore a point of control for all service types, creating communication sessions when necessary.

Access concepts define those objects and interfaces that support user and terminal access to services.

Users need to have flexible access to services, in terms of the locations from which they access the service and the types of terminal they use. User access is therefore distinguished from terminal access. An agent concept is used in defining the TINA-C access model. An agent is this context is a computational object, or collection of objects, that acts on behalf of another entity.

A user agent 107 represents and acts on behalf of a user. It receives requests from users to establish service sessions, or to join existing service sessions, and creates or negotiates with existing service sessions as appropriate. The creation of a service session by a user agent 107 can be subject to subscription and authentication checks. A user agent 107 also receives and processes requests to join a service session from service sessions themselves. This is a form of in-coming call processing where another user has created a service session and invites the user to join in. User agents 107 know the subscribed services that a user may create. This list can be presented to the user when the user logs on to his user agent 107.

A terminal agent 102 is responsible for representing a terminal. It is responsible for obtaining the precise location of a terminal. Two examples are; the network access point a portable computer is attached to, and the cell in which a mobile phone is currently located.

In order to access a service, users must associate their user agents 107 with terminal agents 102. This is part of a logging on process. A user may be simultaneously associated with many terminals. For example, in a video conference a user may be using both a workstation and a telephone. Similarly a terminal may be simultaneously associated with many users, for example, when in a meeting all users associated their user agents with the telephone in the meeting room.

User and terminal agents 107, 102 are computational objects that should have high reliability properties. These are required so that the network software can rely on a fixed point for locating users and terminals in an environment where both may be moving around.

1. Agent Architecture

This section describes the architecture of agents involved in embodiments of the present invention. It is important to note that the application described in the following example (s) only builds intelligence into the user agents, i.e. the negotiation process only occurs between the user agents. Thus, while Terminal Agents and Network Agents exist, there is no intelligence in these agents for the purpose of the present description.

1.1 Inter-Agent Architecture

Figure 4:
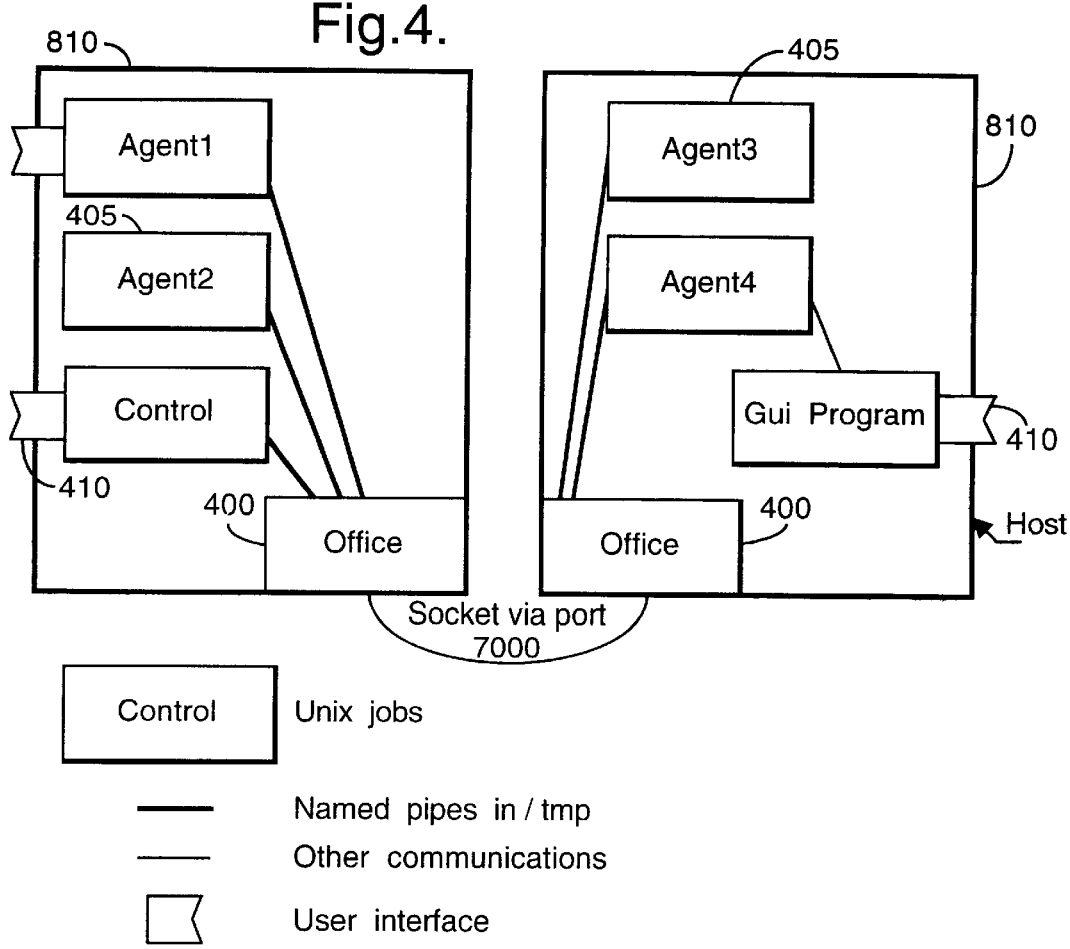
FIG. 4 shows an overall multiple agent architecture and communication links between agents and supporting elements.

Referring to FIG. 4, agents 405 are located on a number of hosts 810. Each host 810 has a UNIX process running, called an "office" 400. Communication between hosts 810 is carried out through the "office" process 400. The communication is based on TCP/IP sockets, using a port (e.g. port 7000). Communication between agents 405 and an office 400 located on the same host 810 are performed through "pipes". Information from the Terminal Agents is also communicated to User Interfaces 410 through the same communication mechanism.

1.2 Intra-Agent Architecture

Figure 5:
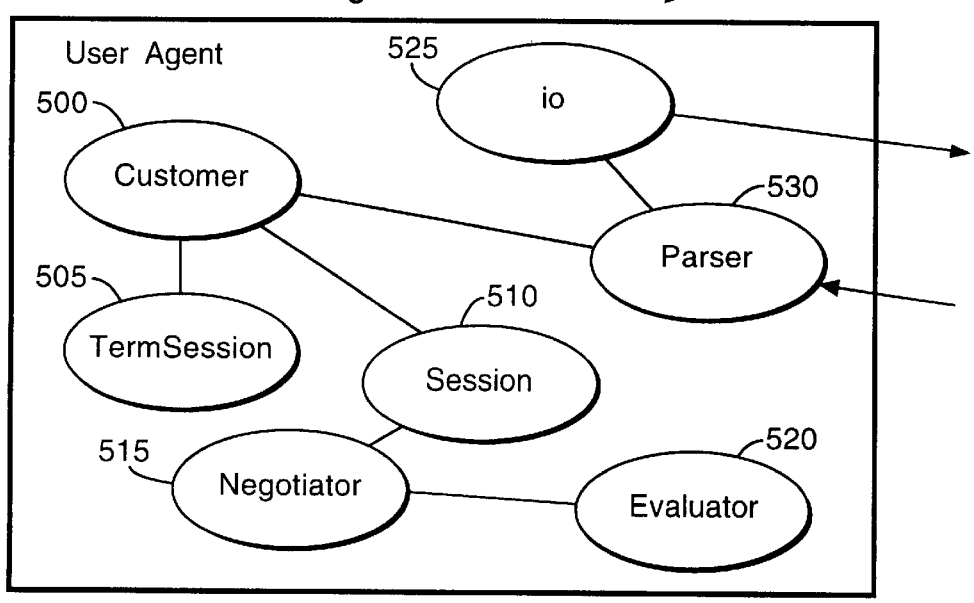
FIG. 5 shows an internal architecture for a user agent for use in the architecture of FIG. 4.

Referring to FIG. 5, the intelligence of the User Agent 107 is comprised of five principal objects: Customer 500, Term-Session 505, Session 510, Negotiator 515 and Evaluator 520. Two other objects, io and parser 525,530, are required for communication from other objects and agents, and ensuring messages are passed on to the appropriate object. The following sections give an overview of the functionality of each object.

Customer Object 500

The customer object handles:

(i) logging on and off (ii) initial queries concerning the configuration information (iii) initial request to accept a call from a caller TermSession Object 505

A terminal session object is created by the caller whenever a request is made to logon at a terminal. The TermSession object 505 handles the initial request by the Caller to make a call Session Object 510

A Session object 510 is created whenever a new call is made. The following functionality is provided:
  (i) Receiving messages concerning the termination of calls either by the callee or from the network
  (ii) Sending requests for user validation to the User Agent Manager Negotiator Object 515

A negotiator object 515 is created upon creation of a session object 510 and succesful validation of a User Agent 107 by the User Agent Manager. The negotiator object 515 handles which message operations to send between the caller and callee's User Agent 107 when a call attempt is made.

Evaluator Object 520

The Evaluator object 520 calculates the initial proposal and subsequent responses to a proposal when a call attempt is made.

2. Knowledge Representation

Figure 6:
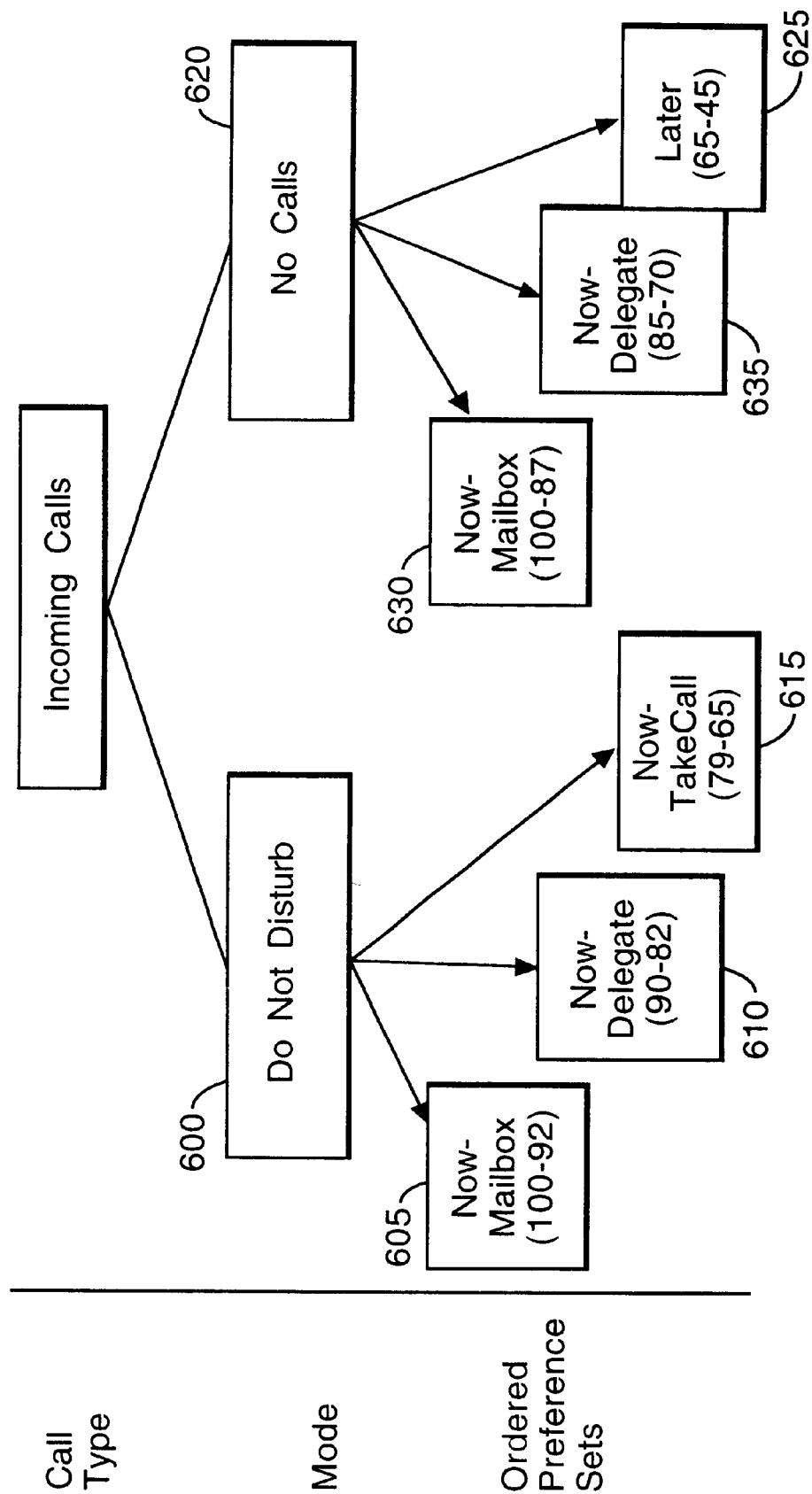
FIG. 6 shows a data set relevant to a user agent as shown in FIG. 5.

Referring to FIGS. 3 and 6, the user agent 107 contains all the current intelligence. It accesses stored information in the User Profile and User Policies datastore 1103. The User Profile contains information on a user's id, password and their preferences while the User Policies datastore holds information on the strategies which should be deployed.

The preferences may include information concerning when calls can be set up at later times (i.e. dynamic time-of-day routing).

When a user logs on, they access the user agent 107 via the User Agent Manager ("CustMan Object" in the Terminal Agent). The user agent 107 accesses the user profile 600 for that user and displays it on screen.

If a user logs off from a terminal, the mode will be changed either automatically or by the user. Otherwise, a user may simply change modes to indicate they have temporarily left a machine without logging off.

2.1 Feature Representation

Figure 13:
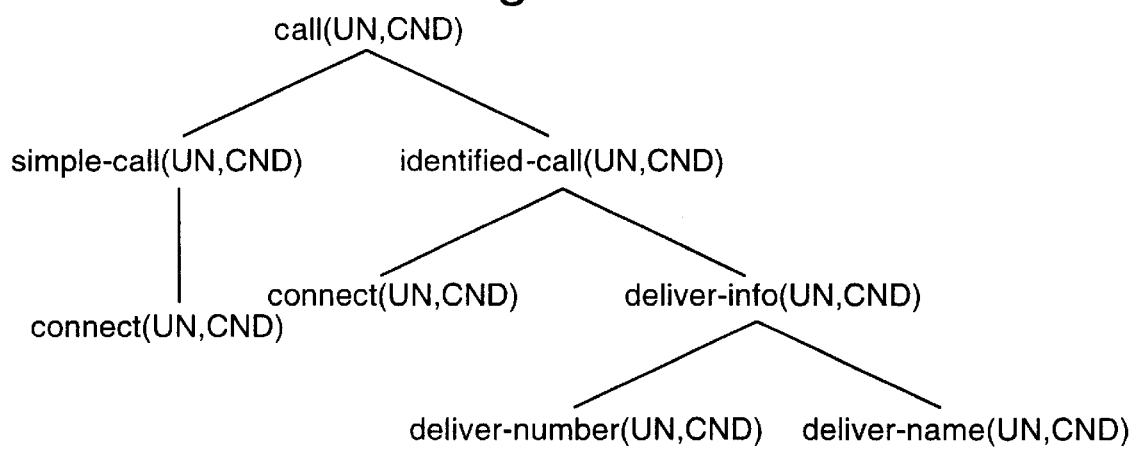
FIG. 13 shows a goal hierarchy for use in solutions according to the prior art.

Referring to FIG. 13, in known agent-based systems such as that described by Griffeths & Velthuijsen (referenced above), a goal hierarchy 1300 can be used to represent the possible plans which can achieve the goals of all the agents involved.

In FIG. 13, one subscriber who has an unlisted number proposes a call to another subscriber with calling number delivery (CND). As the subscriber with an unlisted number does not want his or her number to be generally known, this unlisted number (UN) feature is incompatible with the calling number delivery feature. On receipt of this proposal, CND sees that the proposal does not include the delivery of the number and thus returns the previous proposal with calling-number-delivery added. UN receives this proposal and decides that it is unacceptable. However, he is able to offer a counter-proposal, using his goal hierarchy, with the name delivery instead of the number delivery. This is acceptable to CND and thus returns notification of this agreement.

While, this represents a useful approach in terms of considering the user's behaviours, there are a number of limitations:
  (i) the representation is not rich enough to model more complex constraints such as time;
  (ii) there are no preferences expressed as to which of the possibilities a user would prefer;
  (iii) a single goal hierarchy is required for all users. Some users may not wish other users to know their user policies; and
  (iv) the model could not represent combinations of achieving a call via other mediums of transmission.

In embodiments of the present invention, at least one or more of these limitations can be overcome. A feature can be represented in terms of a high level goal. Taking the goal of not wanting to be disturbed unless urgent, this can be expressed in the form of an ordered set of lower level, alternative goals:
  i) wanting all calls to go to a mailbox
  ii) to be delegated to some named person.
  iii) or, if urgent, will take the call High level goals can thus be mapped into sets of alternative call configurations which can be ranked according to preference. This mapping can be hard coded or achieved through a set of rules which will dynamically assign preference ratings based on a series of questions which guide the user as to which goals they wish to achieve.

As an example, Call Waiting is a service which can be represented as the more general goal of a user not wanting to miss urgent calls.

These high level goals can be used to describe both incoming and outgoing calls. Some further examples are given in the table below:

| High Level Goal |
| --- |
| Outgoing Calls |
| I don't want callees to know my phone number |
| I want outgoing calls to complete now rather than later |
| I want to reach the person concerned if possible rather than voicemail |
| I want to reserve a time to call back if possible if the callee's line is busy (this might be an urgent call or because I am only available now) |
| I want callee to reserve a time to call me back if possible if their line is busy |
| Incoming Calls |
| I do not want to be disturbed unless it is urgent |
| I do not want to take calls between times x and y |
| I want to know who's calling me before I answer |
| I want all incoming calls to complete |

2.2 User Configuration

A user's configuration describes how a user prefers their calls (incoming and outgoing) to be handled. The user's configuration defines, for both incoming and outgoing calls, a set of call configuration options. Each call configuration option within the set is represented by a set of attributes, together with their associated values, and a basic preference rating. Some of the attributes will be fixed, while others will specify a range of values. In the latter case, a numerical indicator will be specified with one or more of the alternative values which indicates an amount to be decremented from the basic preference rating. Thus, each call configuration option of the set has a range of associated preference ratings. This is further discussed below.

By defining a preference structure in relation to a set of call configurations, the user can give priority to one choice of call configuration over another and thus determine a negotiation pattern for that user's agent.

It might be noted that the user agent 107 is persistent. Decisions can therefore be made whether or not the user is active. Also, preferences will usually be set, or changed, prior to call set-up, rather than during.

The following describes firstly the attributes for use in call configurations, and then how a preference structure is applied to those attributes, for a particular user.

2.2.1 Call Configuration Attributes

The attributes describing a particular call configuration are communicated between agents during a negotiation process in the form of proposals and counter-proposals. A call configuration is defined by the following attributes:

(i) caller values: {person, recorded}

This attribute defines who is calling. The caller may be an actual person or it may be a recorded message in the case when the callee is not available to receive calls or mail messages at the present time. The caller may leave a recorded message which then gets sent to the callee at a predetermined time or when the callee next logs on.

(ii) callee: values: {person, queue, mailbox}

This attribute defines how the callee wishes to handle a call. There are three possible values: either (i) the call will be taken by a person directly, (ii) the call can be put in a queue, or (iii) the call can be sent to the mailbox.

(iii) callee-who values: {direct, someone-else [X,Y,,,]}

This attribute defines whether the callee will be the person requested or whether the call will be taken by someone else. In this latter case, a parameter specifies a list of delegates.

(iv) authorised values: {yes, no}

This attribute defines whether the call needs an authorisation code.

(v) medium values: {voice, video, text}

This attribute defines which medium is being used to transmit the call. The 'video' value includes voice.

(vi) schedule values: {now, caller [time], callee [time]}

This attribute defines whether the call is to be taken now or whether it will be taken later. In the latter case, it defines the responsibility for setting up the call (caller/callee) and a time parameter which specifies one of the following possibilities: 'before t1', 'after t1', 'at t1', 'asap'.

(vii) caller info values: {none, name, number}

This attribute represents what information the caller is prepared to provide to the callee. It may take a subset of the above values.

(viii) callee info values: {none, name, number}

This attribute represents what information the callee is prepared to accept from the caller. It may take a subset of the above values.

2.2.2 Call Configuration Options Ordered by Preference Ranges

It is possible to identify a "mode" of operation for a user. This is in practice a high level goal which predetermines some lower level goals and defines a context of operation such as calls to be directed to a mailbox, or person to person only. In practice, the mode can be selected, or determined, by selecting values from the first two or three attributes in a call configuration: caller, callee and callee-who. (The third attribute is only required if the second attribute uses the value 'person'.)

"Do Not Disturb" Mode

In an example, shown in FIG. 6, a user's top priority might be for all incoming calls to be diverted to the mailbox. If this cannot be achieved, calls should be delegated to a named person, and failing that the call might be taken if it really is urgent. This high level goal, with the three options, could be expressed in the form of a 'do not disturb' mode 600. Each option for the "do not disturb" mode is given a basic preference rating, selected to reflect the order of preference. Hence the basic preference rating for "Mailbox" option 605 might be 100, for the "delegated" option 610 the basic preference rating might be 90, and for the "call taken" option the basic preference rating might be 79.

Looking at the "Mailbox" option 605, the top priority can be expressed by selecting the following values for the first three attributes and assigning the maximum basic preference rating to this choice: 100.

| Preference Value: | 100 |
|---|---|
| Caller | person |
| Callee | mailbox |
| Callee-who | direct (default value) |

Having defined these attributes, values can then be defined for the other attributes. For each of these attribute values, there may also be user preferences. For example, the user may prefer calls to be authorised and/or the medium to be voice rather than video. These preferences can be expressed by decrementing the basic preference rating for the "Mailbox" option by a relevant amount for each of the alternatives it is preferred should not be accepted. That is, each such alternative value is given a negative preference rating. A minimum preference rating for a set of call configurations providing one of the three options (ie the bottom end of the preference range for that option) can therefore be determined by summing all the possible negative preference ratings which can occur within a single call configuration and subtracting this from the basic preference rating for the option.

One possible set of values are shown below for the 'mailbox' option 605:

| Preference Range | 100–92 |
|---|---|
| Caller | person: yes (0), recorded: no |
| Callee | person: no; queue: no; mailbox: yes (0) |
| Callee-Who | direct: yes (0) |
| Authorisation | present: no \| absent: yes (0) |
| Medium | voice: yes (−3) \| video: yes (−5) \| text: yes (0) |
| Schedule | now: yes (0) \| caller calls back: no \| callee calls back: no |
| Caller Info | Forename: present: yes (0); absent: no |
| | Surname: present: yes (0); absent: no |
| | Company: present: no; absent: yes (0) |
| Callee info | Forename: present: yes (0); absent: no |
| | Surname: present: yes (−3); absent: yes (0), |
| | Company: present: no; absent: yes (0) |

The table above defines a set of proposed call configurations for the "Mailbox" option 605 (ie where the callee is "mailbox"). The basic preference rating has been set at 100 because the user prefers this option most. There are three values with negative preference ratings, these being where the medium is "voice" or "video" and the callee surname is present. The worst combination available available is medium being "video" (−5) and callee surname present (−3). This provides a sum of −8. Hence the preference range for this "Mailbox" option 605 is 100–92.

An example of one proposed call configuration within this option may be defined as:

caller: person callee: mailbox calleeWho: direct authorised: absent schedule: now medium: text caller forename: present callee forename: present, surname: present which produces a preference rating for this particular user of 97, based on the basic preference rating (100) minus the preference rating for the callee surname present (−3).

This process is repeated by defining the set of call configurations, together with preference ratings, for the two other options for the mode "Do Not Disturb": delegated calls 610 and receiving a call 615. The 'do not disturb' mode is then defined by the union of these three sets.

As shown in FIG. 6, another available mode might be "No Calls" 620. This only differs at first sight, as shown, in the last option which replaces "Now-Take Call" with "Later" 625. However, the preference ratings for the first and second options in this mode, "Now-Mailbox" 630 and "Now-Delegate" 635, may actually be very different in this mode from what they are for the same options in the "Do Not Disturb" mode 600. Indeed, as shown, the preference ranges are now 100–87 and 85–70 as shown.

An analogous outgoing mode, 'completing a call', may represent the goals in decreasing preference of attempting to call a person directly, accepting a delegated call, or failing that leaving a message.

The total set of call configurations for incoming and outgoing calls define a user's "negotiation space", which provides the framework to enable the user agents to make decisions about which goals they wish to achieve.

2.2.3 Example

In the following example, the caller, Mr Smithers wishes to call Mrs Richers. Mr Smithers prefers to call Mrs Richers directly rather than leave a message in her mailbox. He also prefers to setup the call now rather than set up the call later.

Mrs Richers on the other hand, is in the 'do not disturb' mode. She does not want to be interrupted now.

This information can be represented by the two sets of call configurations shown below. A negative number alongside an attribute value indicates that should that option be taken, the preference rating will be decreased by that amount.

Where no multiple values are specified, this implies that only that value will be acceptable in that particular set.

2.2.3.1 Caller's Ordered Set of Call Configuration Options (i.e. Mr Smithers'):

Mode: Contact person now either person-to-person or leave mail message.

Call Configuration Option a): Preference Range: 100–91
Caller: person
Callee: person
who: direct
authorisation: no/yes (−1)
medium: voice
schedule: now/caller sets up call later (−8)
caller info: none
Call Configuration Option b): Preference Range: 90–80
Caller: person
Callee: mailbox
who: direct
authorisation: no/yes (−1)
medium: voice/text (−9)
schedule: now
caller info: none 2.2.3.2 Callee's Ordered Set of Call Configuration Options (i.e. Mrs Richers'):

Mode: Do not disturb
Call Configuration Option a): Preference Range: 100–90
Caller: person/recorded (−1)
Callee: mailbox
Who: direct
Authorisation: no
Medium: voice/video/text (−3)
Schedule: now
Callee info: name/[ ] (−6)
Call Configuration Option b): Preference Range: 90–80
Caller: person/recorded (−1)
Callee: person
Who: someone-else [Fred] (−5),/someone-else [George] (−7),
Authorisation: no
Medium: voice/video
Schedule: now
Callee info: name/none (−2)
Call Configuration Option c): Preference Range: 80–70
Caller: person
Callee: person
Who: direct
Authorisation: yes/no (−6)
Medium: voice/video
Schedule: caller set up call later
Callee info: name/none (−4)

2.2.4 User Profile

A user's profile describes the mapping from the set of high level goals defined by the user to the call configurations. An example is given by FIG. 6.

3. Negotiation

On making a call, a user triggers their user agent. The user agent refers to the user's profile, generates a proposal and transmits it to the callee's user agent. The proposal will comprise one or more call configurations.

On receipt of a proposal, a negotiation process is initiated. The callee's agent is required to accept the proposal, counter with a proposal of their own or reject the proposal. To do that, the callee's user agent will first review the proposal against their own modes, options and preferences to see if there is at least one acceptable call configuration in the proposal. If there isn't, the callee's user agent needs to generate a counter proposal, unless the incoming proposal was too far below the callee's agent's stored preferences. If the latter is true, then the callee's user agent may reject the incoming proposal and the connection will simply fail. If it isn't true, the callee's agent may send back a counter-proposal and the negotiation will continue.

Each agent involved determines their response to a proposal or counter proposal in the negotiation process by taking into account their set of preferences within a given context. The aim is to select and put in place a call configuration which describes a mutually acceptable call handling scenario. That is, a call configuration which falls in the negotiation space of both agents.

Figure 7:
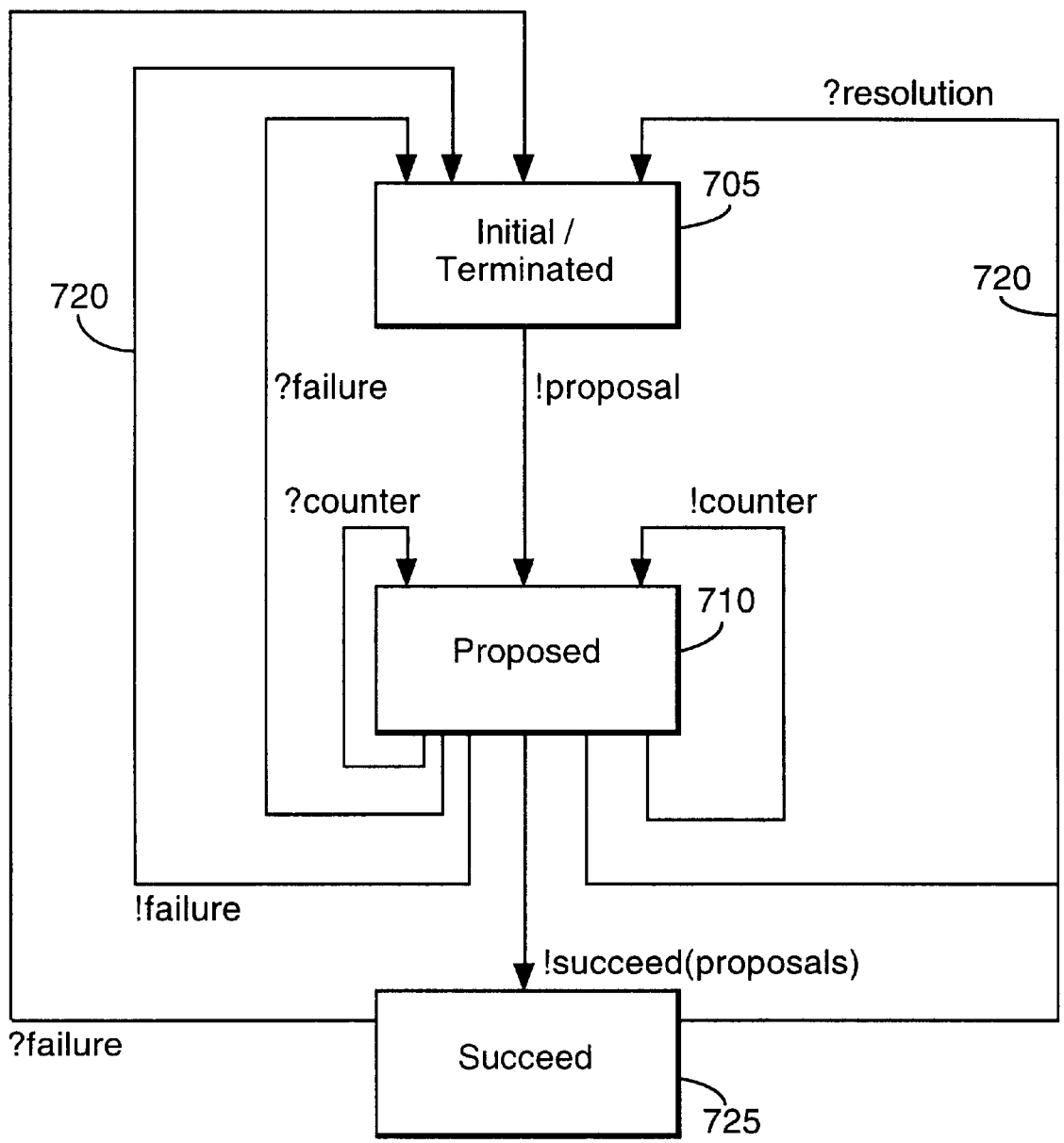
FIGS. 7 and 8 show protocols for user agents of a caller and a callee during call set-up.
Figure 8:
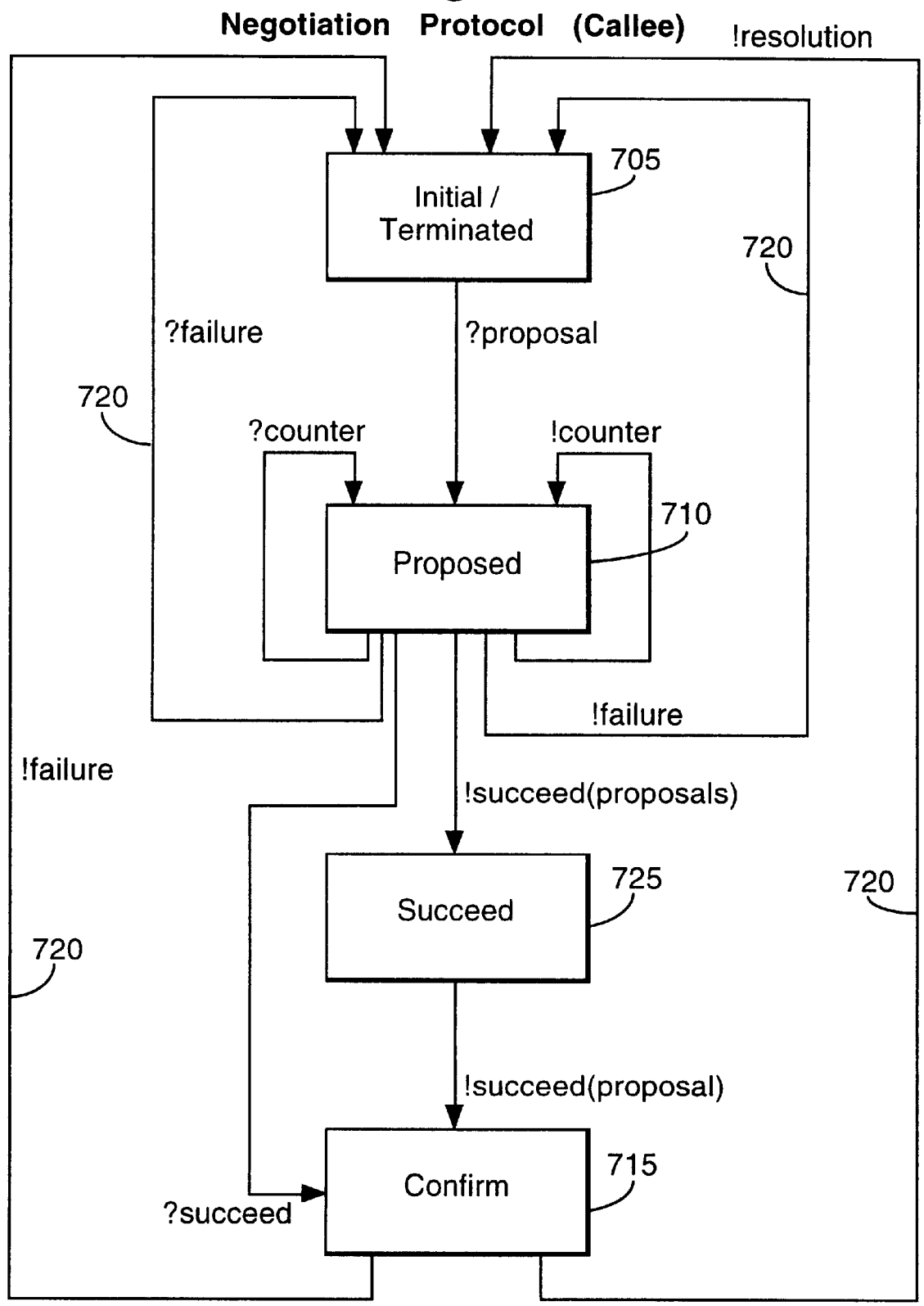

Referring to FIGS. 7 and 8, the negotiation process is now described in more detail.

A proposal, or counter-proposal defines a particular call configuration. In order to communicate these proposals and counter-proposals between user's agents, a number of performatives are introduced. These performatives are given below together with an informal description:

| Performative | Description |
|---|---|
| accept-if | This offer describes a set of proposals which are acceptable. It does not however exclude other possibilities which are not specified in this offer. |
| fail-if-not | This offer describes a set of proposals which if the other user does not accept, forces a failure and the end of the negotiation process. |
| acceptance | the caller/callee user's agent have agreed to a proposal or counter proposal |
| resolution | the callee has agreed to the proposal put forward by the caller |
| failure | the caller/callee's User Agent or the caller/callee cannot agree to any proposals and so the negotiation ends |
| succeed | the caller and callee's User Agent have already agreed to a set of proposals and now the caller/callee chooses which particular proposal from the set of proposals offered. It is possible that a caller will send a set of proposals which is a singleton. In this case, the callee can subsequently receive a resolution. |

3.1 Protocol

Referring to FIGS. 7 and 8, the protocol is defined using a state transition diagram to show the sequence of permitted messages for both the caller and callee. For the purpose of these diagrams, an exclamation mark (!) indicates 'send' to other user and a question mark(?) indicates 'receive' from other user.

A further constraint is also placed on the protocol such that if a configuration has been proposed using an 'accept-if' performative, and it has been refused by the other parties involved in the negotiation, it is not possible to repeat this configuration.

Negotiation is based on:
the knowledge representation used to express the goals and preferences between goals
the strategy used to determine the type of proposal to send and how to evaluate a proposal received from another user's agent.

The knowledge representation has been discussed above. It is the use of goals, expressed as call configuration attributes, together with the associated preference ratings. Interagent communication is then carried out, using knowledge representations, according to a protocol of the following type.

FIGS. 7 and 8 show state transition diagrams for a caller and a callee respectively. They describe what message operations are possible given the state (initial/proposed/confirmed/succeed) 705, 710, 715, 725 and which party (caller/callee) has sent the message. A number of possible events (proposal, counter, succeed (proposals), acceptance, resolution and failure) 720 can occur at each given state.

The object structure describes the content of the negotiation, which in the context of this application, is the proposal describing the combination of call characteristics to be performed.

3.2 Decision Process

This section describes:
how an individual agent makes a decision as to which message operation to send, and
how an agent decides upon the content of the proposal or counter proposal if one is offered.

3.2.1 Environmental Parameters

When a request is made by a caller to make a call, some static information is used:
caller (Name)—the name of the caller
delegated (Via)—if calls have been delegated to someone else, the 'Via' field is filled in with the name of the callee who decided to delegate their calls.

callclass(Class)—the class defines whether the call is business or personal.

In addition, proposals must also take account of a number of attributes which define the environment:

(i) mode—determines the context in which the user wishes to make or receive calls, e.g. 'do not disturb', 'contact callee directly', etc.

(ii) state of a session—free, busy (iii) location—determined by the Terminal Agent which can identify the user's host machine which the user is logged into (iv) intentions—commitments a user has made together with their associated priority (v) current negotiations—other negotiations the user is involved in, but which have not yet come to a successful conclusion These attributes determine the set of proposals from which the initial proposal will be chosen.

3.2.2. Generating Initial Proposal

As mentioned in the previous section, the environmental parameters constrain the set of possible proposals from which any proposal can be selected. The initial proposal will be generated by selecting the proposal from this set with the highest preference rating.

3.2.3 Generating Counter Offers

The process given below provides an overview of how a user agent should respond to an offer:

1. Find a possible proposal using the next highest preference from profile. This preference will take into account the current state of the user, i.e. free or busy, together with previous proposals which have failed. If a preference can be found, go to step 2, else, send a message back to the other user agent indicating a failure together with the reason.

2. Check the possible proposal against intentions. If this passes, go to step 3, else go back to step 1 with a message indicating a failure together with the reason.

3. Check the possible proposal against current negotiations. If this passes, then send proposal back to other user agent indicating the counter proposal together with the reason why counter proposal is being sent. If this fails, then go back to step 1 with a message indicating a failure together with the reason.

Two types of counter offers can be made:

'Accept if'

This offer describes a set of proposals which are acceptable and have not previously been sent. It does not however exclude other possibilities which are not specified in this offer.

'Fail if not'

This offer describes a set of proposals which if the other does not accept, forces the end of the negotiation process. This offer reduces the negotiation space.

3.2.4 Strategies

General

A number of strategies can be generated using the form of the counter proposals discussed above. One such strategy is shown below:

1. If
receive Accept If (proposed) and
f(proposal, myPreferences)=accept then
send 'accept(proposal)'

The function "f(proposal, myPreferences)" determines whether the proposal is acceptable or not by examining the list of proposals.

if
   the size of the list of possible proposals>size$_{proplist}$
then
   if
      the pref(proposal)>pref$_{accept}$ (your threshold value)
   then
      accept (proposal)
   else
      counter with your best proposal from current negotiation space
   else
      accept(proposal)
2. If
   receive a proposal which is unacceptable (i.e. there is no intersection between what has been proposed and the set of acceptable proposals based on your preferences), then
      send 'Fail If Not(whole set of proposals)'
   else
      send 'Accept If (top x % of your preferences)

The first step in the strategy will tend to make call configurations lower down the preference order more acceptable as the negotiation process continues.

The parameters size$_{proplist}$, pref$_{accept}$, x can all be varied giving different degrees of co-operativeness.

A mathematical expression defining a strategy is as follows. The strategy defines the reasoning used to evaluate the following:

initial proposal to offer counter-proposal from the other user's agent response to be made to the other user's counter-proposal Let the negotiation space for user$_i$ at time $t_x$ be defined by NS$_{i, tx}$, where NS$_{i, tx}$ is an ordered set of call configurations $\{c_1, c_2, \ldots, c_n\}$ such that $U(c_i)<U(c_{(i+1)})$, where $U(c_i)$ represents the preference of $c_i$. Let $C_{i,tx}$ and $C_{j,tx}$ represent the set of proposals and counter-proposals being offered by user$_i$ and user$_j$, at time $t_x$, respectively. We define a number of parameters, which affect a user's degree of cooperation (i) Let G be such that $C_{i,tx}=\{c_{min}, \ldots, c_{max}\}$, such that $c_x \leq c_{x+1}$, x=min, ..., max−1, where $U[c_{min}]=G \%*U[c_{max}]$. We can think of G as representing the generosity of the user and dictates the lowest preference value to offer in a set of proposals (ii) Let D be such that if a set of call configurations, $C_{j, tx-1}$, are offered in a counter-proposal, it will be accepted at time $t_x$ if length (NS$_{i, tx}) \leq D$, and NS$_{i, tx-1} \cap C_{j, tx-1} \neq \emptyset$. The value D represents a user's desperateness to agree to a proposal.

(iii) Let A be a constant, such that the set of call configurations, $C_{i, tx}$, will be offered at time $t_x$ such that:

$$U[\min(C_{j, tx-1})] \geq A \%*U[c_{max}] \text{ and } C_{i, tx} \subseteq C_{j, tx-1},$$

where $C_{j, tx-1}$ was the counter-proposal offered by agent j at time $t_{x-1}$. This parameter defines the level of acceptability of a proposal from the other user.

The strategy for user$_i$ at stage $t_x$, x≥0, can then be formulated as a set of rules defining the proposal, $p_{i,tx}$, offered at time, $t_x$. We have three main cases:

(i) $p_{i,t0}=$<accept if, $C_{i, t0}$> where $U[c_{min}]=G \%*U[c_{max}]$, $C_{i, t0}=\{c_{min}, \ldots, c_{max}\}$, len(NS$_{i, t0}) \geq D$, and NS$_{i, t1}=$NS$_{i, t1}\backslash C_{i, t0}$ (ii) If $p_{j,tx-1}=$<accept-if, $C_{j, tx-1}$>, $\forall x, x>0$, then we have the following sub-cases:

a) $p_{j,tx}=$<accept-if, $C_{j, tx}$>, $U[c_{min}]=G \%*U[c_{max}]$, NS$_{i, tx}=$NS$_{i, tx-1}\backslash C_{j, tx-1}$, if NS$_{i, tx-1} \cap C_{j, tx-1} \neq \emptyset$ and len(NS$_{i, tx}) \geq D$, x≥1 b) $p_{j,tx}=$<fail-if-not, $C_{j, tx}$> and $C_{j, tx}=$NS$_{i, tx}=$NS$_{i, tx-1}$ if $\exists x \geq 1$, $p_{i,tx-1} \neq$<fail-if-not, $C_{i, tx-1}$> and NS$_{i, tx-1} \cap C_{j, tx}=\emptyset$, a) $p_{j,tx}=$<succeed, $C_{i, tx}$>, $U[c_{min}]=G \%*U[c_{max}]$, if ($C_{i, tx} \subseteq C_{j, tx-1}$, $U[\min(C_{j, tx-1})] \geq A \%*U[c_{max}]$, or length (NS$_{i, tx}) \leq D$) and NS$_{i, tx-1} \cap C_{j, tx-1} \neq \emptyset$ (iii) If $p_{j,tx-1}=$<fail-if-not, $C_{j, tx-1}$> then we have two sub-cases:

a) If $C_{j,tx-1} \cap$ NS$_{i, tx-1}=\emptyset$, then $p_{j,tx}=$<failure> b) If $C_{j,tx-1} \cap$ NS$_{i, tx-1} \emptyset$ and len(NS$_{i, tx}) \geq D$, x≥1, where NS$_{i, tx}=$INS$_{i, tx-1} \cap C_{j, tx-1}$), then $p_{j,tx}=$<accept-if, $C_{j, tx}$>, $U[c_{min}]=G \%*U[c_{max}]$, $C_{i, tx} \subset C_{j, tx-1}$, The parameters G, D and A can be varied to provide a greater or lesser degree of cooperation.

There are two important aspects of the strategy set out above, these being the "Accept If" and "Fail If Not" mechanisms. Between them, they reduce the negotiation space for the user agents in a relatively short number of rounds of negotiation, for instance four or five rounds. The "Accept If" proposal reduces the negotiation space of the sending agent since those configurations cannot be resent. The "Fail If Not" proposal limits the negotiation space for both agents to what is contained in that proposal.

The way a negotiation might proceed is that a first agent selects a proposal from its top six preferred call configurations. A second agent looks at its own negotiation space and finds the proposal doesn't even meet its lowest criteria, ie the bottom of its preference range. The second agent therefore sends its whole negotiation space as a "Fail If Not" proposal. The first agent selects from the "Fail If Not" proposal and sends an "Accept If" proposal. For instance, the first agent may have found on review that only six call configurations from the "Fail If Not" proposal fall in its preference range. The second agent sends back the best one of the call configurations and the negotiation succeeds and is resolved.

This type of negotiation strategy clearly has application to negotiation procedures other than simply those used in communications, in call setup, and is independently inventive in the context of software agents negotiating to select a mutually acceptable solution from a negotiation space which comprises a range of options which can each be broken up into sub-options and weighted preferentially. For instance, this would be the case where agents are negotiating to establish a pricing strategy over a commodity with multiple components where the components can be mixed and matched to get an optimum combination. This applies in the travel industry where a product (overseas travel) has many different components such as travel mode, accommodation and timing.

4. Connection Setup in the TINA-C Environment

The following describes the setting up of a service session in a TINA-C environment, including the use of user agents to implement an embodiment of the present invention to select and put in place a mutually acceptable configuration for the service session.

The application uses the TINA-C framework as a basis for determining individual agent roles and the sequence of interactions between each of the agents in order to establish a service session.

(It should be noted that, by adopting the TINA 'session' concept, it is possible to avoid the need to represent some features. An example of this is a feature called 'Call Waiting', which enables users to switch between two calls. This feature does not exist as such in the TINA system, since a user can receive any number of calls simultaneously. Every time an incoming call is accepted, a new 'call' window appears on the terminal screen, which is associated with a unique session identifier.)

Figure 9:
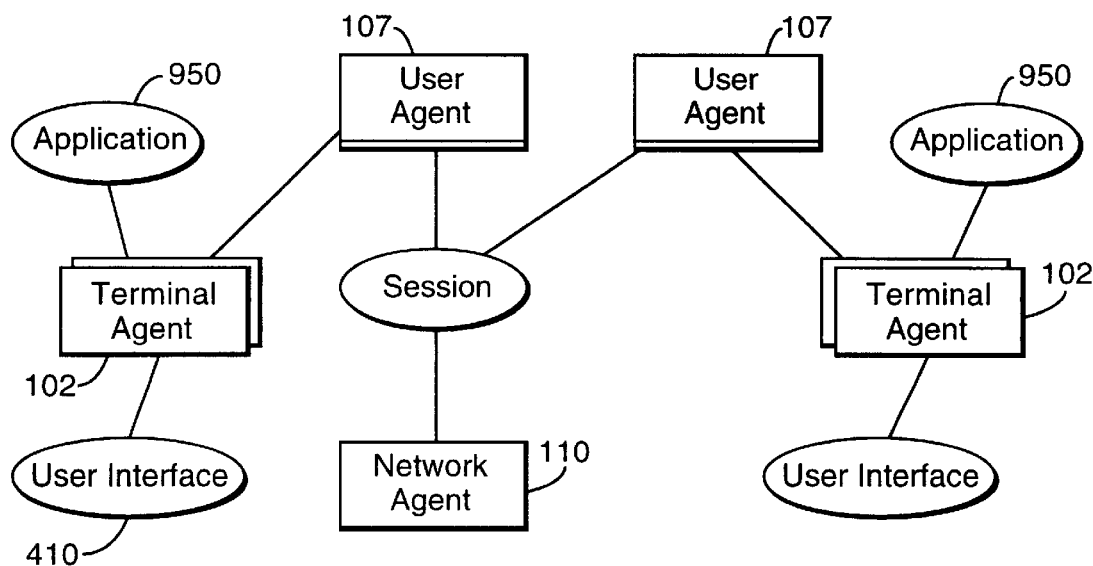
FIG. 9 shows a high level system model for embodiments of the present invention.

Referring to FIG. 9, a system model gives a high level view of the system.

The User Agent 107 contains the intelligence to negotiate on behalf of Users to set up a call.

The Terminal Agent 102 holds information on the resources available and location of a station.

The Network Agent 110 controls the logical and physical connections between the locations of the users involved in calls.

The Application 950 represents the particular program chosen to perform a call. This may be for instance a simple voice call or a multi-media conference call.

The User Interface 410 allows the user to make and receive calls, access and change their user configurations.

4.1 Object Model

Figure 10A:
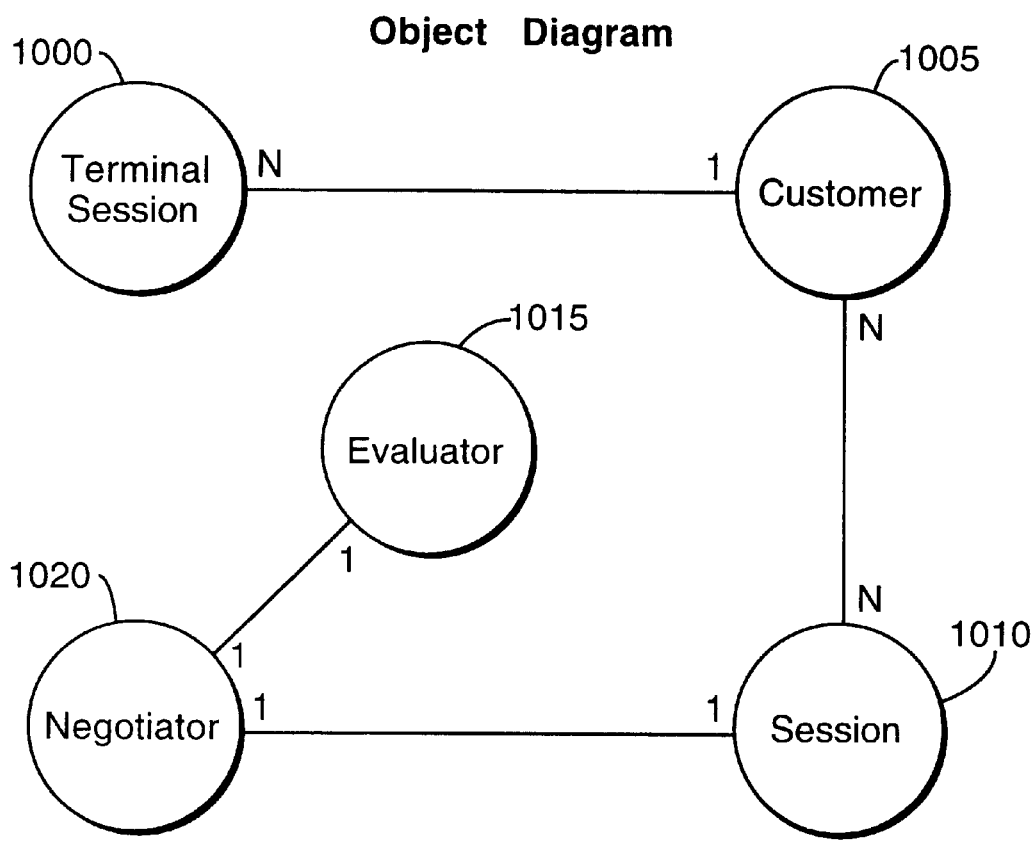
FIG. 10 shows an object model for the application described as an embodiment of the present invention.
Figure 10B:
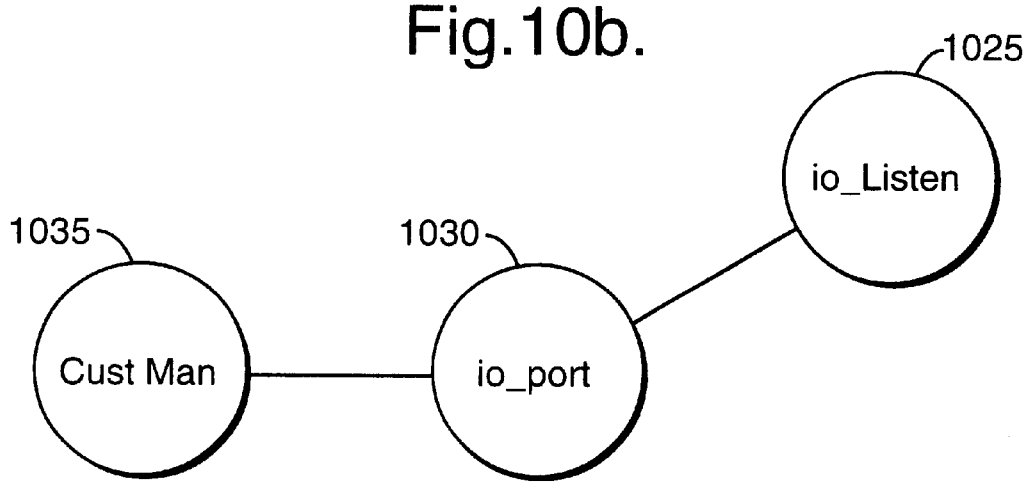

FIG. 10 shows object models for the principal objects of a user agent 107 and a terminal agent 102. Descriptions of the objects are given below.

4.2 Object Description (It should be noted that messages of known type which simply instruct an object or agent to perform a task are not set out below. Only "speech act messages" are detailed. These have a semantic nature, e.g. to inform or request.)

4.2.1 User Agent 4.2.1.1 Customer Object 1005

Attributes name—customer's name passwd—password

Creation method

A customer object is created using the call:

Create(Cust)

where the following parameters are used:

(i) Cust—Customer

Speech Act Messages

The customer object respond to the following speech act messages:

(I) act=inform, nature=logon, address=Address, password=Password, agent=Agent

This message emanates from the User Interface via the Terminal Agent informing the customer object that the user is logging on.

(ii) act=inform, nature=logoff, address=Address, agent=Agent

This message emanates from the User Interface via the Terminal Agent informing the customer object that the user is logging off.

(iii) act=inform, nature=logoff, address=Address, obj=cust, customer=Customer, password=Password This message emanates from the User Interface via the Terminal Agent informing about the password (iv) act=request, nature=config, address=Address, agent=Agent This message emanates from the User Interface via the Terminal Agent, requesting the User Agent's configuration information (v) act=inform, nature=config, config=Config, address=Address, agent=Agent This message emanates from the User Interface via the Terminal Agent informing the User Agent of a change in the Configuration information.

(vi) act=proposal, proposal=Proposal, session=SessionId, agent=Agent

This message emanates from the Caller's User Agent via the negotiator object requesting the Callee's User Agent to accept an initial proposal 4.2.1.2 TermSession Object 1000

Attributes

The attributes for the TermSession object 1000 are:

terminal—Terminal Agent location—name of the station

Creation method

A TermSession object 1000 is created using the call:

create(Agent, Address)

where the following parameters are used:

(i) Agent—Customer (ii) Address—location of the Terminal Agent

Speech Act Messages

The TermSession object 1000 responds to the following speech act messages:

(i) act=request, nature=makecall, callee=Callee, proposal=Password, address=Address, agent=Agent This message emanates from the User Interface via the Terminal Agent to request to make a call.

4.2.1.3 Session Object 1010

Attributes

The attributes for the Session object 1010 are:

initial proposal—the initial proposal put forward by the caller other agent—the other agent involved in the call setup session id—a unique identifier (Caller User Agent, Id)

Creation method

A Session object 1010 is created using the following call:

Create(Agent, Proposal, Session id)

On creating a session, the following parameters are used:

(i) Agent—the other User Agent involved in the call, (ii) Proposal—the initial proposal (iii) SessionId—session identifier Speech Act Messages The Session methods respond to the following speech act messages:

(i) act=inform, nature=userquery, response=ok, user=Agent

A query response from the User Agent Manager to inform the User Agent that the User Agent (Agent) exists.

(ii) act=inform, nature=userquery, response=notok, user=Agent

A query response from the User Agent Manager to inform the User Agent that the User Agent does not exist.

(iii) act=inform, nature=connectfail, session=SessionId

A message from the network to inform the User Agent that the connection has failed.

(iv) act=inform, nature=connectend, session=SessionId

A message from the network to inform the User Agent that the connection has been terminated.

4.2.1.4 Negotiator Object 1020

Attributes

The attributes for the Negotiator object 1020 are:

state—the current state (initial, proposed, confirm)

direct—who is controlling the negotiation (send implies control, receive implies someone else has proposed)

proposals—a list of proposals seen so far, with the latest proposal at the beginning of the list.

otherneg—the other user agent involved in the session session—the joint negotiation Id generated by the controller
Creation method
The Negotiator object 1020 is created using the call:
create(Agent, ProposalParameter, SessionId, Direct)
where the following attributes are used:
  (i) Agent—the other User Agent involved in the call
  (ii) ProposalParameter—the proposal made as part of the call
  (iii) SessionId—the SessionId created by the caller's User Agent
  (iv) Direct—who is controlling the negotiation (send implies control, receive implies someone else has proposed)
Speech Act Messages
The Negotiator object 1020 responds to the following speech act messages:
  (I) act=acceptance, session=SessionId, agent=OtherAgent
  This message emanates from the other agent's negotiator object requesting acceptance for a call setup.
  (ii) act=counter, session=SessionId, proposal=OtherProposal, agent=OtherAgent
  This message emanates from the other agent's negotiator object informing the agent of a counter proposal.
  (iii) act=failure, session=SessionId, agent=OtherAgent
  This message emanates from the other agent's negotiator object informing the agent that the negotiation has terminated unsuccessfully
  (iv) act=resolution, session=SessionId, agent=OtherAgent
  This message emanates from the other agent's negotiator object informing the agent that the negotiation has terminated with a successful conclusion.

4.2.1.5 Evaluator Object 1015
Attributes
There are no attributes for the Evaluator object 1015.
Creation method
The Evaluator object 1015 does not have to be created.
Speech Act Messages
There are no speech acts applicable to this object.

4.2.2 Terminal Agent 4.2.2.1 io_listen Object 1025
Attributes
The attributes of this object are:
socket—server socket
port—socket
loctemplate—address name
Creation method
The io_listen object is created using the call:
create(port)
where port refers to a socket
Speech Act Messages
There are no speech act messages.

4.2.2.2 io_port Object 1030
Attributes
The attributes of the io_port object are:
socket—socket
location—location name
customer—customer name
program—application (rtgui)
agent—terminal agent name
Creation method
The io_port object is created using the following call:
create(socket, Template)
where the attributes are:
  (i) socket—socket
  (ii) Template—Template name containing the host and port number
Speech Act Messages
The io_port object responds to the following messages:
  (i) act=inform, program=Program, host=Host
  A message from the User Interface to inform the Terminal Agent about the application and host.
  (ii) act=inform, nature=logon, customer=Cust
  A message from the User Interface to inform the Terminal Agent about logging on.
  (iii) act=inform, nature=logoff, customer=Cust
  A message from the User Interface to inform the Terminal Agent about logging off.
  (iv) act=request, nature=config, customer=Cust
  A message from the User Interface to request the Terminal Agent for the configuration information.
  (v) act=inform, nature=config, config=Con, customer=Cust
  A message from the User Interface to inform the Terminal Agent about changes to the configuration information.
  (vi) act=inform, nature=makeCall, callee=Callee, mymode=Mode, preferences=preferences
  A message from the User Interface to inform the Terminal Agent about a make call.
  (vii) act=inform, nature=logresponse, address=Cust:Program@Location, password=Password
  A message from the User Agent via the Customer object to inform the Terminal Agent about a response to a logon.
  (viii) act=inform, nature=nosuchcust, address=Cust:Program@Location
  A message from the User Agent via the Customer object to inform the Terminal Agent about a response to a logon and the User Agent does not exist.
  (ix) act=reply, config=Config, address=Cust:Program@Location
  A message from the User Agent via the Customer object to inform the Terminal Agent about its configuration information 4.2.2.3 User Agent Manager (Cust Man) Object 1035
Attributes
The attributes for the custman object are:
functor—function of the agent (i.e. user agent)
Creation method
There are no parameters called to the create method:
Speech Act Messages
The custman object responds to the following speech act messages:
  (I) act=inform, nature=logon, address=Address, password=Password, agent=Agent
  This message emanates from the Terminal Agent requesting a logon.
  (ii) act=request, nature=userquery, user=User, agent=Agent
  This message emanates from the User Agent requesting a query of the existence of the agent (User).

5. Scenarios

Figure 12:
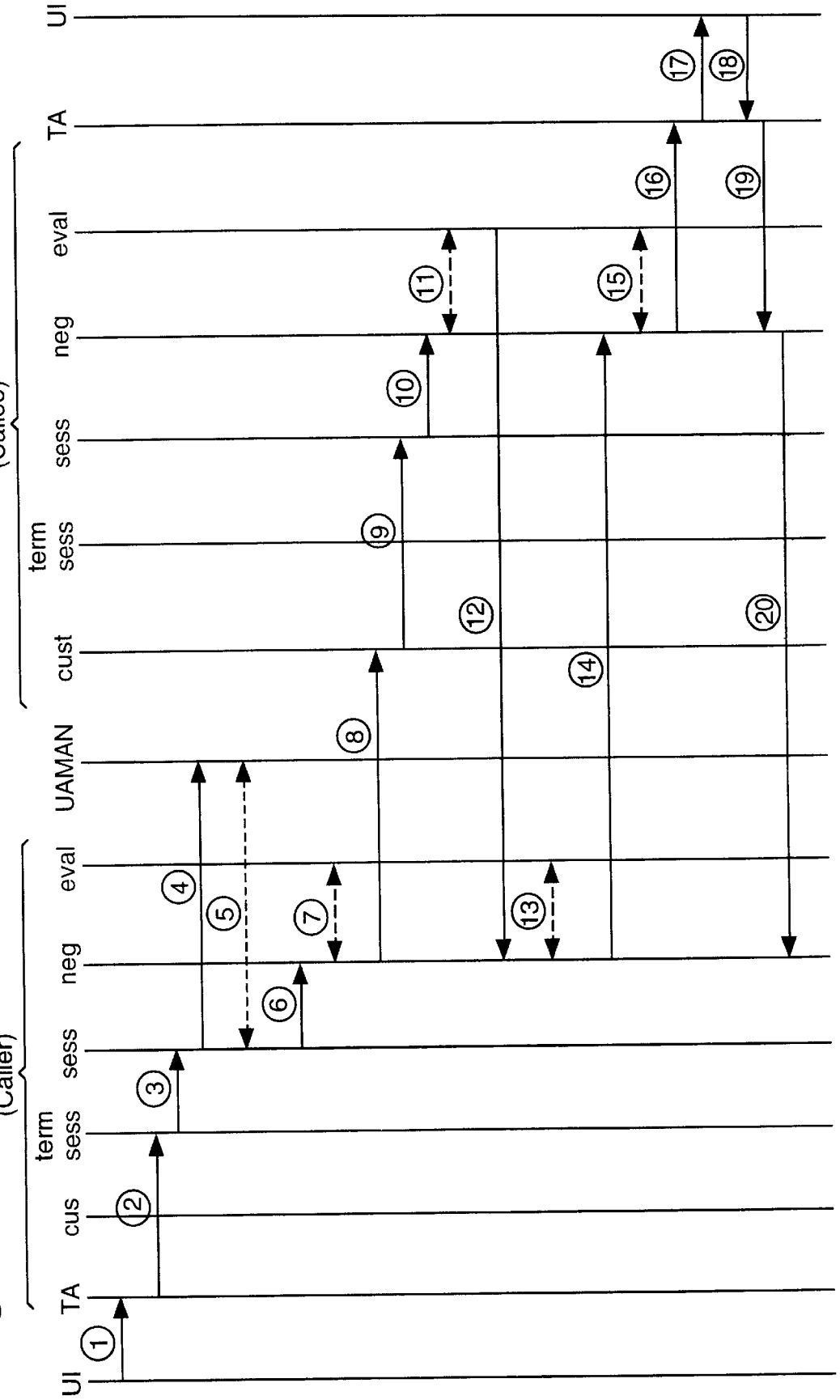

Referring to FIGS. 11 and 12, the following process steps apply during log on by a user and a call attempt by a user. It will be seen that the numbers given below to the process steps are repeated in FIGS. 11 and 12 to indicate which entities are involved in each process step.

5.1 User Logging On
  Process
  The User opens the runtime application.
  1,2. A 'login window' is displayed once the User Interface has registered a connection with the Terminal Agent
  3. The User enters his/her userId and password. A message is sent to the Terminal Agent to request logging on, together with the userId and password to the Terminal Agent.
  4. On receipt of this request, the Terminal Agent passes on the request to the User Agent Manager.
  5. The User Agent Manager sends this message on to the relevant User Agent via its customer object.
  6. The Customer object creates a Termsession object, identified by the Terminal Agent which sent the message and the name of the station being used.
  7. The Caller's User Agent via the customer object determines the validity of the user. If the password is correct, a message is sent to the Terminal Agent.
  8. On receipt of a 'logresponse' message, the Terminal Agent sends a message back to the originating User Interface located on the identified station.
  At this point, the main application window is displayed, enabling users to make or receive calls.

5.2 User Attempting To Make A Call
  Process
  1. On selecting the 'make call' button from the User Interface, a message is sent to the Terminal Agent, containing the proposal, calleeID, mode, preferences and customer.
  2. On receipt of the message, the caller's Terminal Agent sends a message containing the calleeID, current location, situation and proposal to the caller's User Agent via the TerminalSession object. (The preferences are not used at this point. This only defines who is being called and the mode which has been selected—it is not until Step 7 that the preferences based on the mode and other factors such as current state, are used to generate a proposal).
  3. On receipt of this message, the Terminal Session object creates a new Session object.
  4. If the SessionId is empty, then a new Session identifier is created using the ordered pair, (Caller's User Agent, Id). The Caller's User Agent will then send a message to the User Agent Manager to query the validity of the Callee.
  If the SessionId already exists, then the user is responding to a request to join in an existing session.(see Step ) and the SessionId will be taken from the existing session.
  5. On receipt of this message, the User Agent Manager validates the Callee and sends a message back to the Caller's User Agent via the Session object with the appropriate response.
  6. On receipt of a successful response, the Session object creates a negotiator object, identified by the SessionId.
  7. On creation of the negotiator object, the negotiator requests the evaluator to generate an initial proposal.
  8. The negotiator object sends the proposal together with the SessionId to the Callee's User Agent via the customer object.
  9. On receipt of this message, the Callee's User Agent via the Customer object creates a Session object using the existing SessionId.
  10. The Session object creates a Negotiator object for the Callee's User Agent using the existing SessionId.
  11. The negotiator object asks the evaluator object to calculate a response to the initial proposal.
  12. A message is sent back to the Caller's User Agent via the Negotiator object with the appropriate response.
  13. On receipt of this message, the Negotiator object requests the evaluator to calculate a response. This is continued until the Caller's User Agent decides to accept or reject the proposal.
  If the response is to accept the proposal, the Callee's User Agent will send a message to the User Interface via the Terminal Agent to prompt the Callee to accept the call. If the Callee decides to accept the call, a message is sent back to the Terminal Agent to accept the call and this results in a 'resolution' message being sent back to the Caller's User Agent.
  If the response is to reject the proposal, both the Caller and Callee's User Agent will inform their respective users that the call cannot be made and the negotiation will end.
  The following steps have made some assumptions concerning what decisions are made.
  14. The Caller's User Agent via the negotiator object sends a message back to the Callee's User Agent via its negotiator.
  15. The Callee's User Agent via its negotiator calls the evaluator object to calculate a response.
  16. The evaluator decides to accept the counter offer. The negotiator object sends a message to the Terminal Agent to prompt the Callee to accept the call.
  17, 18. The Callee via the User Interface receives the message and sends a message back to the Terminal Agent to accept the call.
  19. The Terminal Agent receives the confirmation from the Callee and sends a message back to the Callee's User Agent via its negotiator.
  20. The negotiator sends a message back to the Caller's User Agent via its negotiator object informing the User Agent that the call proposal has been agreed.
  At this point the negotiator object asks the Session object to send a message to the network to proceed with the connection and to prompt the Caller that the call setup has been agreed.
  It might be noted that although the "callee" will usually be a person, it could also be inanimate. For instance, if a user is not currently logged on, the callee will be a mailbox.

What is claimed is:
1. A method of establishing a connection over a communications network, for service provision between first and second users of the network, there being provided respective connection set-up means for said users, which method comprises:
  i) storing for each of said users data defining at least one connection configuration, said connection configuration comprising at least one operation of the communications network in combination with an operation to be implemented at least in part by functionality of the connection set-up means;
  ii) storing in respect of data defining a connection configuration for the second user, data defining at least one alternative connection configuration; and
  iii) storing in respect of said data defining a connection configuration for the second user, and in respect of the data defining the or each of its alternative connection configuration(s), a respective priority indicator;
the method further comprising a negotiation process for the establishment of a connection by means of:
  iv) transmitting data defining a proposed connection configuration from the connection set-up means for the first user to the connection set up means for the second user, said proposed connection configuration comprising at least one of an operation of the communications network and an operation to be implemented at least in part by functionality of the connection set-up means for the first user;

v) reviewing the data defining the proposed configuration at the connection set-up means for the second user by accessing the data defining configurations and the respective priority indicators stored in respect of the second user; and vi) selecting and transmitting a response to the connection set-up means for the first user, the response being determined at least in part by the result of the review step v) above, and selected from acceptance or rejection of the proposed connection configuration, or comprising data defining a counter-proposed connection configuration, without having access to the stored data defining at least one connection configuration in respect of the first user.

2. A method according to claim 1 wherein the data defining an operation to be performed at least in part by the connection setup means comprises time data and, in the event that the response is acceptance of a connection configuration comprising time data, the connection setup means subsequently attempts to set up a connection in accordance with said time data.

3. A method according to claim 2 wherein said time data comprises a time of day and the connection setup means subsequently attempts to establish connection at that time of day.

4. A method according to claim 2 wherein said time data comprises a time interval and the connection set up means subsequently attempts to establish connection after said time interval has passed.

5. A method according to claim 1 wherein, in the event that the response comprises data defining a counter-proposed connection configuration, the negotiation process further comprises:

vii) reviewing the data defining a counter-proposed connection configuration at the connection setup means for the first user by accessing the data defining configurations and respective priority indicators stored in respect of the first user; and viii) selecting and transmitting a response to the connection setup means for the second user, the response being determined at least in part by the result of the review step vii) above, and selected from acceptance or rejection of the counter-proposed connection configuration, or comprising data defining a further counter-proposed connection configuration.

6. A method according to claim 5 wherein steps v) through viii) are carried out, and repeated if necessary, until a transmitted response is acceptance or rejection of a proposal.

7. A method according to claim 6 which further comprises the step of logging, by the connection setup means for each user and at least for the duration of a single negotiation process, received connection configuration proposals, any subsequent proposal transmitted by either connection set up means excluding proposals previously transmitted by either connection setup means.

8. A method according to claim 1 which further comprises the step of storing, for each of said users, any current data relevant to connection setup for that user, in addition to data defining connection configurations, and the negotiation process further comprises the step of reviewing the additional data prior to transmission of data defining a proposed or counter-proposed connection configuration, and modifying the data defining a proposed or counter-proposed connection configuration accordingly.

9. A method according to claim 8 wherein the additional data comprises one or more of the following:

a) connection mode data;

b) location data for the relevant user with respect to the network;

c) commitment data, indicating commitments previously made by the relevant user; and d) concurrent negotiation process data for the relevant user.

10. A method according to claim 6 wherein the data defining each proposed or counter-proposed connection configuration transmitted from a connection setup means is selected for transmission in accordance with a progression from proposals with a high priority indicator towards proposals with a relatively lower priority indicator, for the relevant user.

11. A method according to claim 1 wherein each connection setup means can be provided for a plurality of users and wherein the method can be carried out concurrently by a connection setup means for more than one user.

12. A method according to claim 1, wherein each connection configuration comprises one or more features providing a component of a communications service, the features being selected from a set of features at least two of which are mutually incompatible.

13. An apparatus for use in establishing a communications connection between a first access point and at least one further access point of a communications network, the apparatus comprising connection set-up means associated with said first access point, the apparatus further comprising:

an interface to the communications network for activating network operations available at said first access point;

a data store for storing data defining at least one connection configuration and an associated priority indicator in respect of said first access point, said connection configuration comprising at least one operation of the communications network in combination with an operation to be implemented at least in part by functionality of said connection set-up means;

wherein said connection set-up means comprise:

means to implement a negotiation process, in co-operation with connection set-up means associated with said at least one further access point, to agree a set of operations of the communications network and of said connection set-up means for implementing said communications connection; and means to implement said agreed set of operations in respect of said first access point;

said negotiation process comprising the steps of:

(i) receiving data defining a proposed connection configuration;

(ii) reviewing the received data in comparison with connection configuration data and priority indicators stored in the data store; and (iii) selecting and transmitting a response to said received proposal, the response being determined at least in part by the result of the review step (ii) and selected from acceptance or rejection of the proposed connection configuration or comprising data defining a counter-proposed connection configuration.

14. Apparatus according to claim 13 wherein the data defining an operation to be performed at least in part by the respective connection setup means comprises a time data field and wherein at least one connection setup means is provided with scheduling means for scheduling connection setup initiation in accordance with the content of a time data field.

15. A method of operating a control apparatus, wherein the control apparatus is arranged to trigger an agreed set of operations comprising at least one of a plurality of operations external to the apparatus and an operation comprising functionality of the control apparatus in combination with at least one of said plurality of operations external to the apparatus, the method comprising the steps:

i) storing a set of data elements, at least one of said data elements comprising data defining an attribute of an operation of the control apparatus in combination with data defining an operation external to the control apparatus;

ii) allocating to each data element a weighting factor;

iii) receiving an input signal representative of a proposed set of operations, expressed in terms of at least one data element;

iv) for each data element in the input signal, searching for that data element in the stored set of data elements;

v) for each data element of the input signal which is found by the search in the stored set of data elements, reviewing the weighting factor allocated to that data element; and vi) generating an output signal, determined by the reviewed weighting factors and representative of a response to the proposal, the response being selected from agreement or rejection of the proposal or comprising at least one data element representing a counter-proposed set of operations.

16. A method according to claim 15 wherein the review of one or more weighting factors comprises summing the total of the weighting factors and comparing the summed total with a stored value.

17. A method of processing data according to claim 15, involving first and second data processing means, wherein the input signal is received by the first data processing means from the second data processing means and the output signal is sent by the first data processing means to the second data processing means.

18. A method according to claim 17 wherein, in the case that the output signal comprises one or more combinations of data elements, together with a condition indicator, the first data processing means stores a record of said combinations and bars subsequent output signals by the first data processing means comprising any one or more of the same combinations.

19. A method according to claim 18 wherein, in the case that the output signal comprises one or more combinations of data elements, together with a condition indicator which is different from the condition indicator of claim 18, the second data processing means generates an output signal which comprises a response selected from d) a signal terminating communications between the data processing means, and e) a signal consisting of any one or more of the same combinations.

20. A method according to claim 16 wherein, in the event that the output signal comprises acceptance, the method further comprises the output of a control signal to control a process or apparatus.

21. A method according to claim 16 wherein, in the event that the output signal comprises a signal comprising at least one data element, said output signal is treated as an input signal by the second data processing means and the second data processing means repeats the method of claim 15, outputting its output signal to the first data processing means, the method being repeated in turn by the first and second data processing means until an output signal comprises either acceptance or rejection.

22. A method according to claim 15 wherein the steps of reviewing the weighting factor allocated to each data element and generating an output signal determined by the reviewed weighting factors, comprise selecting from the stored data elements one or more data elements for which the combined weighting factors are more favourable than the reviewed weighting factor(s) and the output signal comprises the selected set.

23. A method according to claim 17 wherein each input and output signal which is transmitted between the data processing means, and comprises at least one data element, comprises a set of data elements which together define a control signal.

24. A method according to claim 20 and wherein the control signal comprises a connection setup signal for a communications network.

25. A method according to claim 23 wherein the set of data signals which together define a control signal, define a connection configuration for use in the connection setup.

* * * * *